US012626488B2

(12) United States Patent
Lee

(10) Patent No.: US 12,626,488 B2
(45) Date of Patent: May 12, 2026

(54) POST-PROCESSING UNIT FOR NEURAL PROCESSING UNIT

(71) Applicant: DEEPX CO., LTD., Seongnam-si (KR)

(72) Inventor: Ho Chul Lee, Gwangmyeong-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 19/044,857

(22) Filed: Feb. 4, 2025

(65) Prior Publication Data

US 2025/0363777 A1     Nov. 27, 2025

(30) Foreign Application Priority Data

May 23, 2024   (KR) ........................ 10-2024-0067309
Jul. 29, 2024   (KR) ........................ 10-2024-0100508

(51) Int. Cl.
*G06V 10/764*          (2022.01)
*G06V 10/25*           (2022.01)
*G06V 10/82*           (2022.01)

(52) U.S. Cl.
CPC ............ *G06V 10/764* (2022.01); *G06V 10/25* (2022.01); *G06V 10/82* (2022.01)

(58) Field of Classification Search
CPC ....... G06V 10/764; G06V 10/25; G06V 10/82
See application file for complete search history.

(56) References Cited

U.S. PATENT DOCUMENTS

| | | | |
|---|---|---|---|
| 2021/0050095 A1 | 2/2021 | Podilchuk et al. | |
| 2022/0222477 A1* | 7/2022 | Shen .................... | G06V 10/955 |
| 2023/0096102 A1 | 3/2023 | Kim et al. | |
| 2025/0022248 A1* | 1/2025 | Cabaleiro ............... | G06F 18/30 |

OTHER PUBLICATIONS

Joseph Redmon, Santosh Divvala, Ross Girshick, Ali Farhadi; Proceedings of the IEEE Conference on Computer Vision and Pattern Recognition (CVPR), 2016, pp. 779-788 (Year: 2016).*
Anupreetham, Anupreetham, et al. "High throughput fpga-based object detection via algorithm-hardware co-design." ACM Transactions on Reconfigurable Technology and Systems 17.1 (2024): 1-20. (Year: 2024).*
Anupreetham, Anupreetham, et al. "End-to-end FPGA-based object detection using pipelined CNN and non-maximum suppression." 2021 31st International Conference on Field-Programmable Logic and Applications (FPL). IEEE, 2021. (Year: 2021).*
Cooper, Combining Neural Network Processors and DSPs to Achieve the Best AI Performance, Jan. 17, 2023, https://www.synopsys.com/articles/npus-dsps-for-ai.html, last accessed May 9, 2025 2:54:39 PM. (Year: 2023).*
Hall, Mathew, and Vaughn Betz. "HPIPE: Heterogeneous layer-pipelined and sparse-aware CNN inference for FPGAs." arXiv preprint arXiv:2007.10451 (2020). (Year: 2020).*
Vrbaski, Vladimir, et al. "Puppis: Hardware Accelerator of Single-Shot Multibox Detectors for Edge-Based Applications." Electronics 12.22 (2023): 4557. (Year: 2023).*

* cited by examiner

*Primary Examiner* — Ross Varndell

(57)          ABSTRACT

According to one example of the present disclosure, a post-processing unit may be provided. The post-processing unit may be implemented in register transfer level (RTL) code and designed to interface with a neural processing unit (NPU) configured for object detection computations of a neural network model. The post-processing unit may include a processing unit configured to filter a plurality of bounding boxes transmitted from the NPU and output only those that satisfy a particular condition and one or more input registers configured to store data output from the processing unit.

20 Claims, 17 Drawing Sheets

S100

Activation — S110

Class Argmax — S120

Filter by score — S130

Decode Box Locations — S140

NMS — S150 to Host

Perform, by NPU, at least Multiply and Accumulate
Operation on Input Data to Generate Bounding Boxes
S210

Send Bounding Boxes from NPU to PPU via Bus
S220

Filter Bounding Boxes and Selectively
Output Subset of Bounding Boxes by PPU
S230

Store Data Output in Memory of PPU
S240

POST-PROCESSING UNIT FOR NEURAL PROCESSING UNIT

CROSS-REFERENCE TO RELATED APPLICATIONS

This application claims priority to Republic of Korea Patent Application No. 10-2024-0100508, filed on Jul. 29, 2024, and Republic of Korea Patent Application No. 10-2024-0067309, filed on May 23, 2024, which are incorporated by reference in their entirety.

BACKGROUND OF THE DISCLOSURE

Humans have the intelligence to recognize, classify, infer, predict, control/decision making, and the like. Artificial intelligence (AI) is the artificial imitation of human intelligence.

The human brain is made up of tons of nerve cells called neurons. Each neuron is connected to hundreds to thousands of other neurons through connections called synapses. In order to mimic human intelligence, the operation of biological neurons and the connections between neurons are modeled in a neural network (NN) model. In other words, a neural network is a system of nodes connected in a layer structure that mimics neurons.

SUMMARY OF THE DISCLOSURE

Embodiments relate to a post-processing circuit that is separate from a neural processing unit (NPU). The post-processing circuit includes an access circuit, a processing circuit and memory. The access circuit enables the post-processing circuit to communicate with the NPU via a bus. The processing circuit filters a plurality of bounding boxes received from the NPU and selectively outputs a subset of the bounding boxes that satisfy a predetermined condition as data output. The memory stores the data output from the processing unit.

In one or more embodiments, the data output includes for each of the bounding boxes in a region of an image and class scores indicative of probability that classes of objects being present in each bounding box.

In one or more embodiments, the post-processing circuit further includes a first computation circuit configured to select one or more classes for each bounding box as the subset of the data output by comparing class scores of classes for each bounding box.

In one or more embodiments, the post-processing circuit further includes a second computation circuit configured to extract one or more bounding boxes by comparing a class confidence score of each bounding box with a threshold confidence score. The class confidence score represents probability that an object of a class is present in each bounding box and derived from an object presence confidence score and the class scores. The object presence confidence score is included in the data output and is indicative of probability that an object is present in each bounding box.

In one or more embodiments, the second computation circuit is configured to determine the class confidence score as a product of the object presence confidence score and a class score with the subset of classes extracted by the first computation circuit.

In one or more embodiments, the memory further stores the subset of classes for each bounding box extracted by the first computation circuit.

In one or more embodiments, the memory includes a plurality of memory registers, and an address generation logic for accessing the plurality of memory registers.

In one or more embodiments, the processing circuit is configured to perform a non-maximum suppression (NMS) operation on the one or more bounding boxes extracted by the second computation circuit to remove redundant or overlapping bounding boxes of the plurality of bounding boxes.

Embodiments also relate to a system including a bus, a neural processing unit (NPU) and a post-processing circuit. The NPU is coupled to the bus and configured to perform at least multiply and accumulate operations on an input data to generate a plurality of bounding boxes. The post-processing circuit is coupled to the bus and includes an access circuit configured to communicate with the NPU via the bus to receive the plurality of bounding boxes, a processing circuit filters the plurality of bounding boxes and selectively outputs a subset of the bounding boxes that satisfy a predetermined condition as data output. The post-processing circuit includes memory that stores the data output from the processing unit.

Embodiments also relate to a method for performing operations associated with a neural network model. A neural processing unit (NPU) is coupled to the bus and performs at least multiply and accumulate operations on an input data to generate a plurality of bounding boxes. The plurality of bounding boxes are sent from the NPU to a post-processing circuit via a bus. The plurality of bounding boxes are filtered and a subset of the bounding boxes that satisfy a predetermined condition is selectively output as data output by the post-processing circuit. The data output is stored in an internal memory of the post-processing circuit.

DETAILED DESCRIPTION OF THE EMBODIMENT

Figure 1A:
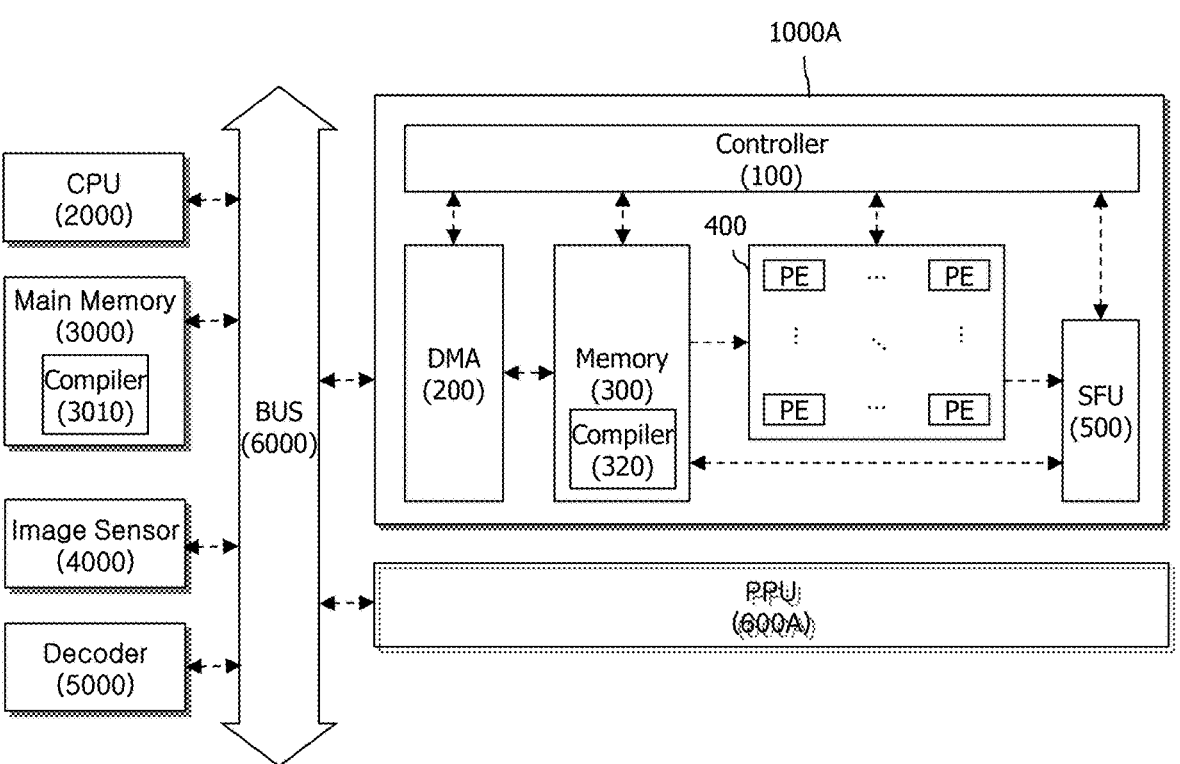
FIG. 1A is a block diagram illustrating a system where a post-processing unit implemented separately from a neural processing unit, in accordance with an example of the present disclosure.

Particular structural or step-by-step descriptions for examples according to the concept of the present disclosure disclosed in the present specification or application are merely exemplified for the purpose of explaining the examples according to the concept of the present disclosure.

Examples according to the concept of the present disclosure may be embodied in various forms. Examples according to the concept of the present should not be construed as being limited to the examples described in the present specification or application.

Examples according to the concept of the present disclosure may apply various changes. The present disclosure may take many forms. Accordingly, specific examples are illustrated in the drawings and described in detail in the present disclosure. However, this is not intended to limit the examples according to the concepts of the present disclosure to a specific disclosure form. Therefore, it should be understood that all changes, equivalents or substitutes included in the spirit and scope of the present disclosure are included in the present disclosure.

Terms such as first and/or second may be used to describe various components. However, the present disclosure should not be limited by the above terms. These terms are only used for the purpose of distinguishing one component from another. For example, without departing from the scope of rights according to the concept of the present disclosure, a first element may be termed a second element, and similarly, a second element may also be termed a first element.

When an element is referred to as being "connected to" or "in contact with" another element, it is understood that the other element may be directly connected to or in contact with the other element, but other elements may be disposed therebetween. On the other hand, when it is mentioned that a certain element is "directly connected" or "directly connected" to another element, it should be understood that no other element is present therebetween. Other expressions describing the relationship between elements, such as "between" and "immediately between" or "adjacent to" and "directly adjacent to", etc., should be interpreted similarly.

In the present disclosure, expressions such as "A or B", "at least one of A or/and B" or "one or more of A or/and B" may include all possible combinations thereof. For example, "A or B", "at least one of A and B" or "at least one of A or B" may refer to both (1) including at least one A, (2) including at least one B, or (3) including both at least one A and at least one B.

As used herein, expressions such as "first", "second", "first or second" may modify various elements, regardless of order and/or importance. Said expressions are used only to distinguish one element from other elements, and does not limit the elements. For example, the first user apparatus And the second user device may represent different user device regardless of order or importance. For example, without departing from the scope of rights described in this disclosure, the first element may be named as the second element, and similarly, the second element may also be renamed as the first element.

Terms used in present disclosure are only used to describe specific examples, and may not be intended to limit the scope of other examples. The singular expression may include the plural expression unless the context clearly dictates otherwise. Terms used herein, including technical or scientific terms, may have the same meanings as commonly understood by one of ordinary skill in the art described in this document.

Among terms used in present disclosure, terms defined in a general dictionary may be interpreted as having the same or similar meaning as the meaning in the context of the related art. Unless explicitly defined in this document, it should not be construed in an ideal or overly formal sense. In some cases, even terms defined in the present disclosure cannot be construed to exclude examples of the present disclosure.

The terms used herein are used only to describe specific examples, and are not intended to limit the present disclosure. Singular expressions include plural expressions unless the context clearly dictates otherwise. In this specification, terms such as "comprise" or "having" are intended to indicate that the described feature, number, step, operation, component, part, or combination thereof is present. Accordingly, it should be understood that the presence or addition of one or more other features, numbers, steps, operations, components, parts, or combinations thereof is not precluded.

Unless defined otherwise, all terms used herein, including technical or scientific terms, have the same meaning as commonly understood by one of ordinary skill in the art to which this disclosure belongs. Terms such as those defined in commonly used dictionaries should be interpreted as having a meaning consistent with the meaning in the context of the related art. Unless explicitly defined in this disclosure, it is not to be construed in an ideal or overly formal sense.

Each feature of the various examples of the present disclosure may be partially or wholly combined or combined with each other. Various examples of the present disclosure are technically capable of various interlocking and driving as can be fully understood by those skilled in the art. Each of the examples of the present disclosure may be implemented independently of each other or may be implemented together in an association relationship.

In describing the examples, descriptions of technical contents that are well known in the technical field to which the present disclosure pertains and are not directly related to the present disclosure may be omitted. This is to more clearly convey the gist of the present disclosure without obscuring the gist of the present disclosure by omitting unnecessary description.

Definitions of Terms

To facilitate understanding of the present disclosure, the following is a brief summary of terms used herein.

NPU: Abbreviation for neural processing unit, which may refer to a processor specialized for computing a neural network model independent of a CPU.

NN: Abbreviation for neural network, a network of nodes connected in a layer structure, mimicking the way neurons in the human brain are connected through synapses, to mimic human intelligence.

Information of a neural network: The information may include the structure of the network, information about the number of layers, information about the connection relationship of each layer, information about the parameters of each layer, information about the computational processing method, information about the activation function, the data type of the parameters of each layer (e.g., floating-point or integer), and the bitwidth of each parameter.

DNN: Abbreviation for deep neural network, which can refer to an increase in the number of hidden layers of a neural network to achieve higher artificial intelligence.

CNN: Abbreviation for convolutional neural network, a neural network that functions similarly to the visual cortex of the human brain in processing images. Convolutional neural networks are known to be well-suited for image processing and are known for their ability to extract features from input data and identify patterns in the features.

Transformer: The transformer neural network is a DNN based on attention techniques. It utilizes many matrix multiplication operations. A transformer can take an input value and parameters such as query (Q), key (K), and value (V) to obtain an output value, attentions (Q,K,V). Based on the output value (i.e., the attentions (Q,K,V)), the transformer can process various inference operations.

Kernel: Refers to the weights of the N×M matrix of convolutions. Each layer of the neural network model has a plurality of kernels, and the number of kernels may be referred to as the number of channels, the number of filters, and the like.

RTL code: The design of circuits for specific devices or systems is typically performed at the register transfer level (RTL). At this stage, the circuit is described in RTL code and subjected to functional verification through simulation. Once the RTL simulation is complete, the circuit design is converted into a gate-level representation through logic synthesis, followed by further verification at the gate level via simulation. A circuit for a neural processing unit, a circuit for a post-processing unit, or a system on chip (SoC) described below with reference to the drawings can be implemented using RTL code. RTL code represents the design of a digital circuit at a high level of abstraction, describing its operation and data flow based on clock cycles. RTL code is typically written in hardware description languages (HDLs), such as Verilog or VHDL. RTL code defines a digital circuit in terms of data transfer between registers and the logical operations performed on the data. It is widely used for simulation, synthesis, and verification during the design and development of integrated circuits (ICs). Synthesis refers to the process of converting RTL code into gate-level designs suitable for physical implementation on silicon. Key elements of RTL code include registers, combinational logic circuits, and state machines. Registers, defined by flip-flops or latches, serve as storage elements for holding data. Combinational logic circuits perform data operations such as addition, subtraction, and logical functions like AND/OR. State machines manage the sequence of operations and control the order of data transfers. Together, these elements define the structure and functionality of a circuit at the RTL stage, facilitating efficient simulation, verification, and synthesis for hardware implementation. In one example of the present disclosure, the post-processing unit may be provided as RTL code written in a hardware description language (HDL), such as Verilog or VHDL, for the purpose of intellectual property licensing.

Neural Network (NN) models are categorized according to the number of layers into 'single-layer neural networks' and 'multi-layer neural networks'. A typical multi-layer neural network consists of an input layer, a hidden layer, and an output layer. (1) The input layer is the layer that receives external data, and the number of neurons in the input layer is the same as the number of input variables. (2) The hidden layer is located between the input and output layers and receives signals from the input layer, extracts features, and passes them to the output layer. (3) The output layer receives signals from the hidden layer and outputs them to the outside. The input signals between neurons are multiplied by their respective weights, which have a value between 0 and 1, and then summed up. If this sum is greater than the threshold of the neuron, the neuron is activated and implemented as an output value through the activation function.

On the other hand, increasing the number of hidden layers in a neural network to achieve higher artificial intelligence is called a deep neural network (DNN). There are many types of DNNs, but convolutional neural networks (CNNs) are known to extract features from input data and identify patterns in the features. A convolutional neural network (CNN) is a network structure in which the operations between neurons in each layer are implemented as the convolution of a matrix of input signals and a matrix of weight kernels.

Convolutional neural networks are neural networks that function similarly to the visual cortex of the human brain, which processes images. Convolutional neural networks are known to be suitable for image classification, object detection and the like. Convolutional neural networks are composed of convolutional operations, activation function operations, and pooling operations processed in a specific order (e.g., FIG. 3). In a convolutional neural network, convolutional operations take up most of the computation time. Convolutional neural networks use a kernel in the form of a matrix to extract the features of each channel's image, and pooling to provide homeostasis against movement or distortion. In each channel, a feature map is obtained by the convolution of the input data and the kernel, and an activation function is applied to generate an activation map for that channel. Pooling can then be applied. The layer that finally classifies the pattern is located at the end of the convolutional neural network and can be exemplified by the fully connected layer. In the computational processing of convolutional neural networks, most of the operations are performed via convolutional or matrix multiplication.

However, for the efficiency and accuracy of neural network model operations related to image classification and object detection, post-processing operations such as additional filtering and deduplication of the output parameters (e.g., feature maps) may be performed.

Conventionally, in this case, the post-processing operations described above may be performed on a central processing unit (CPU) external to the neural processing unit and the data subsequently processed by the CPU may be stored in a memory external to the neural processing unit.

The memory external to the neural processing unit comprises a plurality of memory cells, each of which has a unique memory address. Whenever the neural processing unit recalls feature maps or weights stored in the main memory, or recalls other parameters, a latency of several clocks may be consumed to access the main memory cell corresponding to the address in the memory. These latencies may include column address strobe (CAS) latency and row address strobe (RAS) latency. Hence, the time and power consumed to read the necessary data and parameters (e.g., weights, feature maps, or kernels) from a memory external to the neural processing unit to the neural processing unit is significant.

The time and power for retrieving necessary data—such as parameters, including weights, feature maps, or kernels—from a memory external to the neural processing unit (NPU) to the NPU is considerable.

According to one example of the present disclosure, a post-processing unit may operate in conjunction with a NPU to efficiently perform operations, such as filtering and deduplication, on output parameters (e.g., feature maps), thereby enhance the efficiency and accuracy of neural network model computations. The post-processing unit may perform these operations without relying on a central processing unit (CPU) coupled to the NPU via a bus. Further, the post-processing unit may process computation data by, for example, filtering and deduplication results, without accessing main memory external to the NPU.

FIG. 1A is an example diagram illustrating a system where a PPU 600A is separate from NPU 1000A, in accordance with an example of the present disclosure. The system includes PPU 600A and NPU 1000A, as well as multiple peripheral circuits. At least some of the circuit(s) of the system may be formed as circuit(s) in a system-on-chip (SoC). The NPU 1000A may perform various neural network inference functions in communication with the PPU 600A, a CPU 2000, a main memory 3000, an image sensor 4000, and a decoder 5000. Each of the PPU 600A, NPU 1000A, CPU 2000, main memory 3000, image sensor 4000, or decoder 5000 may be formed as an independent circuit, but is not limited thereto.

The PPU 600A may comprise circuitry formed on the same semiconductor die as the CPU 2000. The PPU 600A and the CPU 2000 may comprise circuitry integrated on the same semiconductor die. In one embodiment, the PPU 600A and the NPU 1000A may be circuits integrated on the same semiconductor die. In another embodiment, the PPU 600A, the NPU 1000A, and the CPU 2000 may be circuits integrated on the same semiconductor die. In yet another embodiment, the PPU 600A, the NPU 1000A, the CPU 2000, and the main memory 3000 may be circuits formed on the same semiconductor die. Additionally, the PPU 600A may comprise a semiconductor die interconnected with at least one of the NPU 1000A or the CPU 2000, each comprising a semiconductor die, utilizing chiplet technology. Additionally, the PPU 600A may comprise a semiconductor die interconnected with at least one of the NPU 1000A, the CPU 2000, and the main memory 3000, each comprising a semiconductor die, utilizing chiplet technology. When chiplet technology is applied, it may further include an interposer. Alternatively, the main memory 3000 may comprise a plurality of semiconductor dies utilizing chiplet technology.

Each of the elements described above may be categorized by its operation function, and each of the elements may be implemented as a circuit board, a silicon substrate, a resistor element, a transistor, and the like. Thus, each element may be a semiconductor circuit with numerous transistors connected thereto, some of which may be difficult to identify and distinguish with the naked eye, and may be identified only by operation. Accordingly, each of the elements of FIG. 1A and FIG. 1B may be referred to as a circuit unit.

Each of the PPU 600A, CPU 2000, main memory 3000, image sensor 4000, and decoder 5000 described above may communicate via a bus 6000 to send data to and receive data from the NPU 1000A. According to one example of the present disclosure, the bus 6000 may be embodied as an advanced extensible interface (AXI) bus. However, without limitation, the NPU 1000A may also be configured to be directly coupled to at least one of the elements described above.

The NPU 1000A may be defined as a processor specialized for the operation of a neural network model. In particular, the NPU 1000A may be specialized for matrix operations or convolutional operations, which account for the majority of the computation in the neural network model. Although only a single NPU is illustrated in FIG. 1A, two or more NPUs that operate in conjunction with PPU 600A may be provided in the system.

The NPU 1000A may include a controller 100, a direct memory access (DMA) 200, a memory 300, a plurality of processing elements (PEs) 400, a special function unit (SFU) 500, and PPU 600. The elements of the NPU 1000 may be distinguished by their operation functions, and each element may be formed utilizing circuit elements such as a resistor and a transistor. Thus, each element may be a semiconductor circuit with numerous connected transistors. Some of the aforementioned elements may be difficult to identify and distinguish with the naked eye, and may be identified only by its operation. Accordingly, functional units of the NPU 1000A may be referred to as circuits.

The controller 100 may control operations associated with computing the neural network model performed by each of the DMA 200, the memory 300, the PEs 400, and a special function unit (SFU) 500. The controller 100 may be directly coupled or indirectly coupled to each of the DMA 200, memory 300, a plurality of PEs 400, SFU 500, to enable communication between the components. For example, the controller 100 may allocate the capacity of each of the parameters in the memory 300 based on the capacity of the memory 300. The controller 100 may be configured to control the NPU 1000A based on machine code (e.g., binary code) of a compiled neural network model. For example, a compiler 320 may generate machine code that determines, based on hardware characteristics of the NPU 1000A (e.g., number of PEs, amount of memory, functions provided by a special function unit, presence of a post-processing unit, and the like), a read/write sequence of data of the neural network model, a processing sequence of layers of the neural network, an operation sequence of convolutional multiplication, an operation sequence of matrix multiplication, and a read and write operation sequence of data of the DMA. Accordingly, the controller 100 may control the NPU 1000A based on the machine code.

The controller 100 may obtain schedule information that schedules an order of operations of the neural network model to be performed by the NPU 1000 based on the directed acyclic graph (DAG) of the neural network model compiled by compiler 3010 stored in main memory 3000 and executed by CPU 2000. The compiler 3010 may determine an operation schedule that can accelerate the operation of the neural network model by determining the number of PEs of the NPU 1000, the size of the memory 300, the size of the parameters of each layer of the neural network model, and the like. According to the computation schedule, the controller 100 may be configured to control the required number of PEs for each computation step and to control the read and write operations of the required parameters in the memory 300 for each computation step. The compiler 3010 may efficiently schedule the operations according to the information of the hardware structure and performance of the NPU 1000A. The compiler 3010 may determine data locality based on the order of the layers of the neural network, the order of the operations of the unit convolution and/or matrix multiplication, and generate compiled machine code based on the order of the data required to compute the neural network model.

In some examples, the NPU 1000A includes an embedded compiler 320. The embedded compiler 320 may perform some operations in addition to or in place of external compiler 3010. According to the configurations described above, compiler 3010 and/or compiler 320 of the NPU 1000A may generate machine code upon input of files in the form of various AI software frameworks. For example, AI software frameworks may include TensorFlow, PyTorch, Keras, XGBoost, mxnet, DARKNET, ONNX, and the like.

The DMA 200 may allow the NPU 1000A to directly access, read and/or write to the main memory 3000A and/or PPU 600A. The NPU 1000 may read various data associated with the neural network model from the main memory 3000 via the DMA 200. The main memory 3000 may be embedded in a system-on-chip (SoC) or may be configured as a separate memory device. Data for post-processing may also be sent to PPU 600A from NPU 1000A via bus 6000.

The memory 300 may be located in an on-chip region of the NPU 1000A, and may perform caching or storing of data processed in the on-chip region. The memory 300 may also be referred to as cache memory. The memory 300 may read and store at least some of the data associated with performing operations associated with the neural network model from the main memory 3000. The memory 300 may be configured to store all or part of the neural network model according to the memory capacity settings for each parameter and the data size for each layer of the neural network model. Representative parameters of data processed in the neural network model may include, among other data, attention parameters, KV cache, an activation map, an input feature map, an output feature map, and weights. Specifically, the memory 300 of NPU 1000A may read and store parameters corresponding to input data from the main memory 3000. Additionally, the memory 300 may read and store parameters corresponding to output data from the plurality of PEs 400.

The memory 300 may be embodied as one or more of read-only memory (ROM), static random access memory (SRAM), dynamic random access memory (DRAM), Resistive random access memory (RAM), Magneto-resistive RAM, Phase-change RAM, Ferroelectric RAM, Flash Memory, high-bandwidth memory (HBM), and the like. According to one example of the present disclosure, the memory 300 may be embodied as SRAM, which is advantageous in terms of computational processing speed. Further, the memory 300 may be organized into at least one memory unit (e.g., a bank). The memory 300 may comprise homogeneous memory or heterogeneous memory.

The data stored in the memory unit of the memory 300 is not static and may change dynamically. By varying the memory allocation of the memory 300 to different types of parameters and data, the utilization rate of the memory 300 may be increased. In other words, the data stored in the memory banks of the memory 300 (e.g., parameters of the neural network model) may be changed to any of the following as needed: attention parameters, KV cache parameters, activation map parameters, input feature map parameters, weights parameters, and output feature map parameters. Further, the size of data for each type of parameter stored by the memory 300 may vary for each computational step.

The PEs 400 are hardware circuits that perform multiplication and accumulation (MAC) operations. The plurality of PEs 400 may be configured to receive, as input data, an input feature map and/or a kernel corresponding to a layer of the neural network, part of the layer of the neural network or multiple layers of the neural network. A processing element (PE) in the plurality of PEs 400 may be configured to perform functions such as addition, multiplication, accumulation, and the like to perform operations as defined by the neural network model. The PE may include, among other components, a multiply and accumulate (MAC) operator, and an arithmetic logic unit (ALU) operator.

In one example, a PE may take an input feature map or a part of the input feature map, perform convolution operations using the kernel and output an output feature map or a part of the output feature map. The plurality of PEs 400 or the processing element PE may also be referred to as an artificial intelligence (AI) computing unit. In another example, the PE may perform a general matrix multiply (GEMM) operation or a matrix multiply operation on the input feature map using weights to output an output feature map or a part of the output feature map. More specifically, the PE may multiply the input feature map in the form of a matrix with a weight matrix, and then add a bias to the matrix to output an output feature map or a part of the output feature map in the form of a matrix. In the NPU, the matrix multiplication may be performed at a high speed by parallel processing, thereby enabling efficient processing of the matrix multiplication operation.

The PE may include circuitry designed to handle only integer type parameters as input. In such a case, the input parameters of the PE may be converted to integers of a specific bitwidth and be stored in the memory 300. Such PE may reduce the power consumption compared to PEs that support floating point and may be easier to implement as an on-device component.

The SFU 500 may process a number of activation functions for imparting nonlinearity to the output feature map. The activation functions processed by the SFU 500 may include, but are not limited to, SiLU functions, Softmax functions, sigmoid functions, hyperbolic tangent (tanh) functions, ReLU functions, Leaky ReLU functions, Maxout functions, or ELU functions that result in nonlinear outputs with respect to inputs. It may be technically difficult to support all activation functions in the NPU 1000. Therefore, the NPU 1000 may also approximate various activation functions through a piecewise linear function approximation algorithm and piecewise linear function processing circuitry. These activation functions can be optionally applied after the MAC operation. The result of an operation applied with an activation function is referred to as an activation map.

In some embodiments, the SFU 500 may be configured to include a floating-point multiplier circuit for performing decimal point operations. In other embodiments, the SFU 500 may be configured to communicate with the PEs and may include circuitry designed to receive integer-type parameters from the PEs. In such a case, the SFU 500 may be further configured to include an inverse quantizer circuit configured to convert the integer-type parameter to a floating point-type parameter. The SFU 500 may be configured to process an activation function operation with the floating-point type parameters. Further, the SFU 500 may be configured to further include a quantization circuit configured to convert a parameter of a floating-point type at the end of the activation function operation to a parameter of an integer type. According to the above-described configuration, the SFU 500 may be configured to process the floating-point operation by de-quantizing the integer parameter when a floating-point operation is required, and to re-quantize the result. In other words, a NPU according to one example of the present disclosure may include a processing element circuit configured to process an integer type parameter and a special function circuit unit pipelined thereto, where the special function circuit unit includes a quantization circuit and a de-quantization circuit and may be configured to process an activation function operation with a floating-point type parameter. According to the above-described configuration, the SFU 500 effectively communicates with the PEs that support only integer parameters, and may directly convert and process the integer parameters without support from circuitry outside the NPU.

In some examples, the post-processing unit (PPU) 600 may be configured to process a number of activation functions for imparting nonlinearity to the output feature map.

Figure 1B:
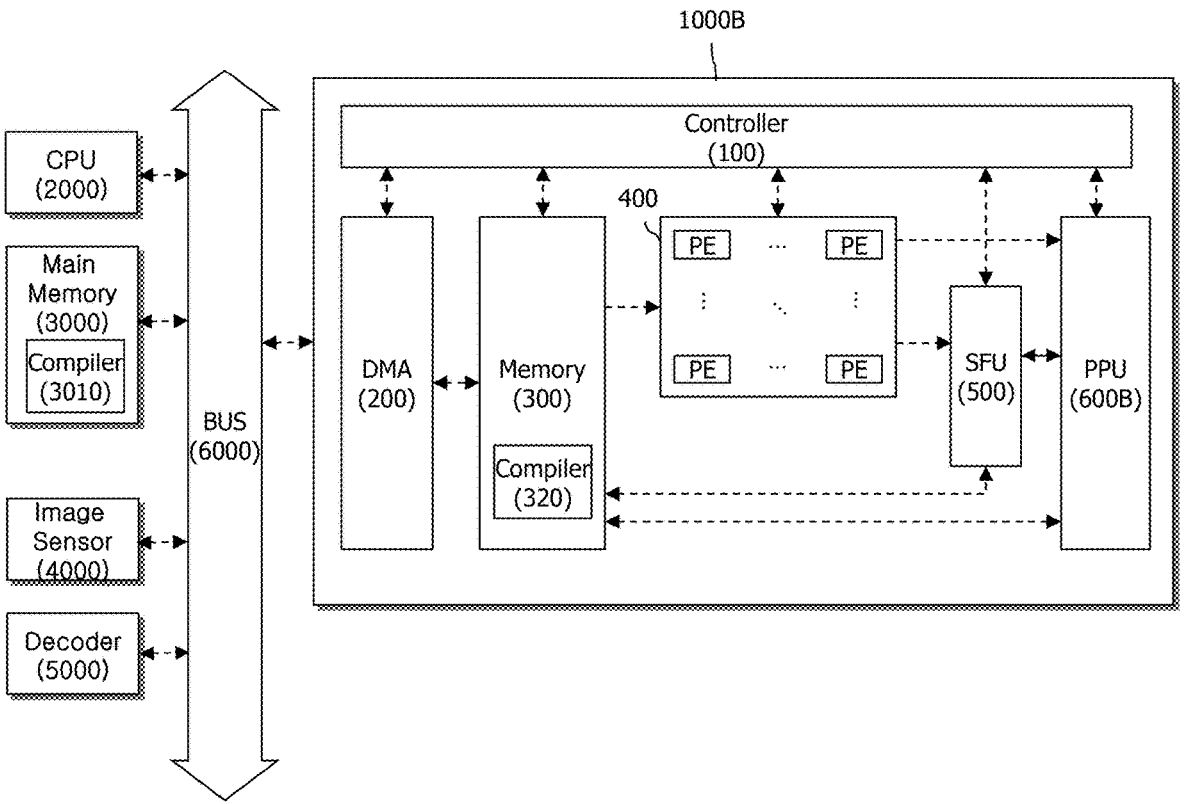
FIG. 1B is a block diagram illustrating a system where a post-processing unit is integrated within a neural processing unit, in accordance with an example of the present disclosure.

FIG. 1B is an example diagram illustrating a system where PPU 600B is integrated within NPU 1000A, in accordance with an example of the present disclosure. The system of FIG. 1B is different from the system of FIG. 1A in that PPU 600B is integrated into NPU 1000B and communicates with the memory 300 and the PEs 400 via internal bus in NPU 100B. Further, controller 100 further controls various operations associated with PPU 600B since PPU 600B is located within NPU 1000B whereas PPU 600A of FIG. 1A is located outside the NPU 1000A and hence is controlled by other devices in the system (e.g., CPU 2000). Otherwise, components illustrated in FIG. 1B operate in substantially in the same manner as those of FIG. 1B, and their explanations are obviated herein for the sake of brevity. NPU 1000A and NPU 1000B are hereinafter collectively referred to as NPU 1000.

Figure 2:
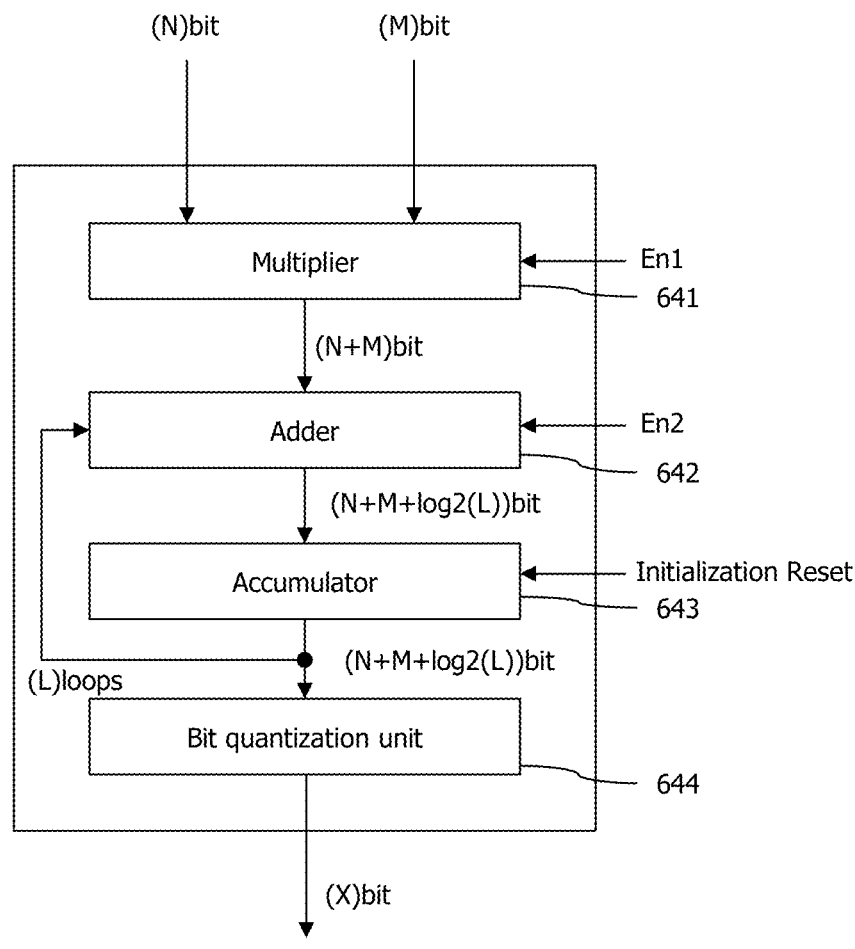
FIG. 2 is a schematic diagram illustrating a processing element in the neural processing unit, in accordance with an example of the present disclosure.

FIG. 2 is a schematic diagram illustrating the PE according to one embodiment. Referring to FIG. 2, the PE may include, among other components, a multiplier 641, an adder 642, an accumulator 643, and a bit quantization unit 644. Various modifications may be made to PE of FIG. 2 to account for the computational characteristics of a target neural network model.

The multiplier 641 is a circuit that multiplies the input (N)-bit data and the (M)-bit data. The result of the multiplier 641 is output as (N+M)-bit data, where N and M are integers greater than zero. The first input that receives the (N)-bit data that changes dynamically whereas the second input that receives the (M)-bit data receive a parameter that remains relatively constant. For example, a set of weight parameters trained in a neural network model may be constant while the PE is processing a same layer of the neural network while input parameters such as activation parameters, feature map parameters, attention parameters, KV cache parameter computed with the set of weight parameters may vary frequently relative to the set of weight parameters.

A parameter that is variable means that the parameter is updated each time incoming input data to the neural network is updated. For example, the node data of each layer may be a MAC operation value reflecting the weight data of a neural network model where the node data of each layer in the neural network changes whenever the input video changes every frame. A parameter that is static means that the parameter is maintained regardless of the update of the incoming input data. For example, the weight data may remain constant if the neural network model is used to infer object detection of the video data.

The variable parameters fed to the first input may be node data of a layer of the neural network model. The node data of the neural network model may be one of input data of the input layer, accumulated values of the hidden layer, and accumulated values of the output layer. The constant parameters fed to the second input may be weight data of a connection network of the neural network model.

The controller 100 may improve memory reuse by taking into account the nature of the constant parameters. The variable parameters are computational values of each layer, and the controller 100 may identify reusable variable parameters based on the machine code of the compiled neural network model, and control the memory 300 to reuse the memory.

Figure 4:
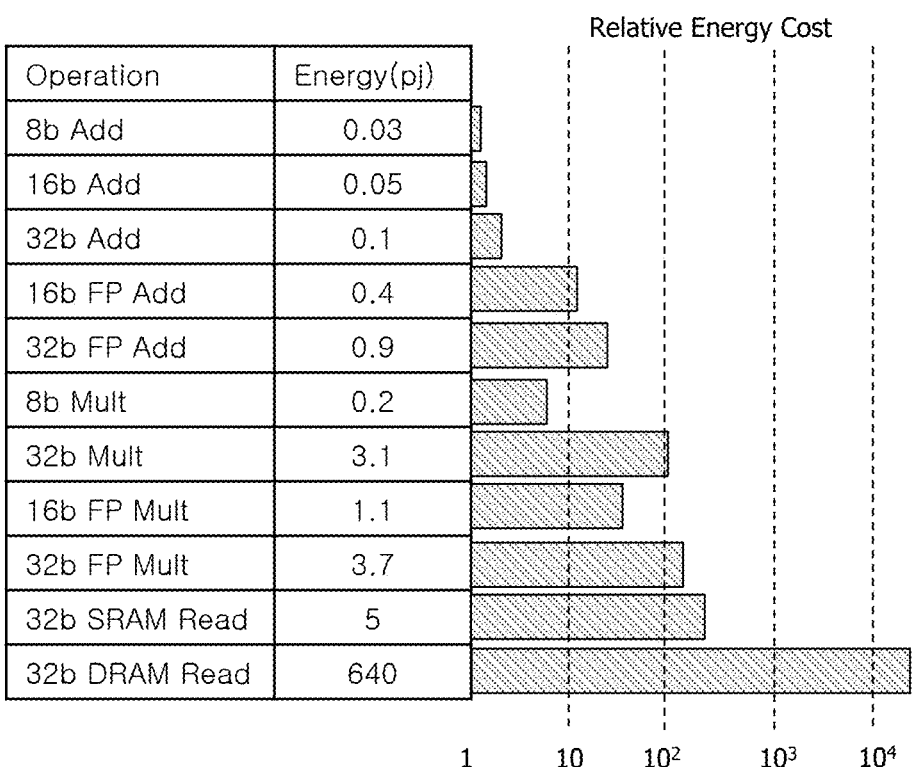
FIG. 4 is a schematic diagram describing energy consumption per unit operation of a neural processing unit, according to one example of the present disclosure.

The constant parameters are the weight data of each connection network, and the controller 100 may recognize the constant parameters of the repeatedly used connection networks based on the structure data of the neural network model or the neural network data locality information, and may control the memory 300 to reuse the parameters stored in the memory 300. Reusing the parameters means that the parameters stored in the memory 300 are not deleted, or copied or moved to the main memory 3000, but are reused in the subsequent operation. According to the above-described configuration, it beneficially reduces power consumption according to the operation of the main memory 3000 as shown in FIG. 4. Furthermore, it has the effect of eliminating the delay time that occurs when the NPU 1000 transmits data to and from the main memory 3000. The controller 100 may have information on reusable variable parameters and reusable constant parameters based on the machine code of the compiled neural network model. Accordingly, the controller 100 may be configured to control the memory 300 to reuse the parameters stored in the memory.

The processing element may constrain the operation of the multiplier 641 such that when a zero is input at an input of one of the first input and the second input of the multiplier 641, the multiplier 641 may not perform an operation because the processing element knows that the result of the operation will be zero even if the operation is not performed. For example, when a zero is provided to an input of one of the first input and the second input of the multiplier 641, the multiplier 641 may be configured to operate in a zero-skipping manner.

For zero-skipping, each of the PEs included in the plurality of PEs 400 may be enabled or disabled, respectively. The controller 100 may provide an enable or disable signal to each of the PEs on a clock-by-clock basis to each of the PEs. When the PE is disabled, the multiplier 641 may be configured to deactivate according to a level of the first enable signal En1. Accordingly, the power consumed by the operation of the multiplier 641 may be reduced. For example, information about the power consumption of the multiplier may be provided with reference to FIG. 4.

For zero skipping, each of the PEs included in the plurality of PEs 400 may be enabled or disabled, respectively. The controller 100 may provide an enable or disable signal to each of the PEs on a clock-by-clock basis to each of the PEs. When the PE is deactivated, the adder 642 may be configured to deactivate according to a level of the second enable signal En2. Accordingly, the power consumed by the operation of the adder 642 may be reduced. For example, information on power consumption of the adder may be provided with reference to FIG. 4. In some examples, each PE may be designed to receive a respective control signal from the controller 100 for controlling (i.e., enabling or disabling) the zero-skipping operation.

In some examples, each multiplier 641 of each PE may receive a respective control signal from the controller 100 for controlling zero-skipping operations. According to the configurations described above, the power consumption of the multipliers can be reduced by zero-skipping.

In some examples, each adder 642 of each PE can be designed to receive a respective control signal from the controller 100 for controlling the zero-skipping operation. According to the configurations described above, the power consumption of the adders can be reduced by zero-skipping.

In some examples, each of the multiplier 641 and adder 642 of each PE may be designed to simultaneously receive a respective control signal for controlling the zero-skipping operation from the controller 100. According to the configurations described above, the power consumption of the multipliers and adders may be reduced by zero-skipping.

In some examples, the weights are constant parameters generated by training, and the machine code from which the neural network model comprising the weights has been compiled may be programmed to input respective control signals for controlling the zero-skipping operation to each of the PEs at which values with zero weights are input.

The number of bits of data input to the first input and the second input may be determined according to the quantization of the node data and the weight data of the respective layers of the neural network model. For example, the node data of the first layer may be quantized to 5 bits and the weight data of the first layer may be quantized to 7 bits. In such a case, the first input may be configured to receive 5-bit data and the second input may be configured to receive 7-bit data, i.e., the number of bits of data input to each input may be different.

The PE may receive quantization information of the data input to each input. The neural network data locality information may include quantization information of the input data and output data of the PE.

The NPU 1000 may control when the quantized data stored in the memory 300 is fed to the inputs of the PEs, the quantized bitwidth are converted in real time. That is, different layers may have different quantized bitwidth, and the PEs may be configured to generate input data by converting the bitwidth in real time by receiving bitwidth information from the NPU 1000 in real time as the bitwidth of the incoming data is converted.

The accumulator 643 uses the adder 642 for a number of (L) loops to accumulate the operation value of the multiplier 641 and the operation value of the accumulator 643. Thus, the number of bits of data at the output and input of the accumulator 643 may be output as (N+M+log 2(L)) bits, where L is an integer greater than zero. When the accumulator 643 finishes accumulating, the accumulator 643 may receive an initialization reset signal to initialize the data stored inside the accumulator 643 to zero. However, examples according to the present disclosure are not limited thereto. The accumulator 643 stores the accumulated value even when zero-skipping is enabled in the corresponding PE. Thus, subsequent values can be accumulated even when zero skipping is enabled.

The bit quantization unit 644 may reduce the bitwidth in the data output from the accumulator 643. The bit quantization unit 644 may be controlled by the controller 100. The bitwidth of quantized data may be output as (X) bits, where X is an integer greater than zero. According to the above-described configuration, the plurality of PEs is configured to perform a MAC operation, and the Plurality of PEs may quantize and output the MAC operation result. Such quantization may further reduce power consumption as the number of (L) loops increases. Reducing power consumption may also reduce heat generation in edge devices. Reducing heat generation may beneficially reduce the possibility of malfunctioning operations caused by a high temperature of the NPU 1000.

The output data X bits of the bit quantization unit 644 can be the node data of the subsequent layer or the input data of a convolutional product. If the neural network model is quantized, the bit quantization unit 644 may receive quantized information from the neural network model. However, the controller 100 may also analyze the neural network model to extract the quantized information. Thus, the output data X bits may be converted to a number of quantized bits to correspond to the quantized data size. The output data X bits of the bit quantization unit 644 may be stored in the memory 300 as a quantized bitwidth.

The plurality of PEs of the NPU 1000 according to one example of the present disclosure includes a multiplier 641, an adder 642, an accumulator 643, and a bit quantization unit 644. The bit quantization unit 644 may reduce the number of bits of data in (N+M+log 2(L)) bits output from the accumulator 643 by the plurality of PEs to a number of bits in (X) bits. The controller 100 may control the bit quantization unit 644 to reduce the number of bits in the output data by a predetermined number of bits from the least significant bit (LSB) to the most significant bit (MSB). Reducing the number of bits in the output data may beneficially reduce power consumption, computation, and memory usage. However, if the number of bits is reduced below a certain length, the inference accuracy of the neural network model may decrease rapidly. Therefore, the quantization level (i.e., the reduction of the number of bits in the output data) can be determined by comparing the degree of reduction in power consumption, computation, and memory usage with the degree of reduction in the inference accuracy of the neural network model. The quantization level can also be determined by setting a target inference accuracy for the neural network model and testing the accuracy of the inference with progressively lower bitwidth. The quantization level can be determined separately for each layer of the neural network model.

By adjusting the number of bits of (N) bit data and (M) bit data of the multiplier 641, and by reducing the number of bits of the operation value (X) bit by the bit quantization unit 644, the plurality of PEs may improve the MAC operation speed while reducing the power consumption, and also has the advantage of, among others, making the convolution operation of the neural network model more efficient.

Figure 3:
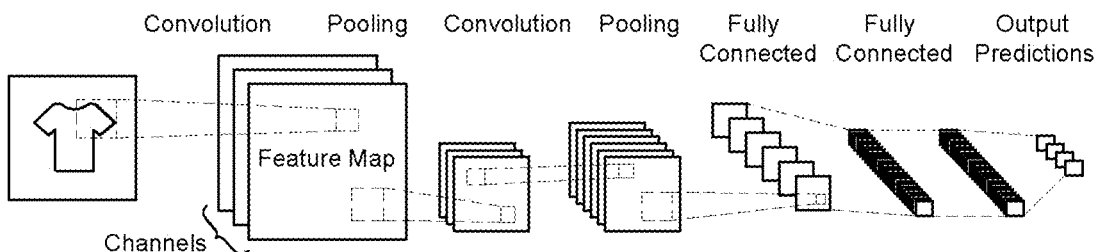
FIG. 3 is a schematic diagram illustrating a convolutional neural network relevant to the present disclosure.

FIG. 3 is a schematic diagram illustrating a convolutional neural network relevant to the present disclosure. A convolutional neural network can be a combination of one or several convolutional layers, a pooling layer, and a fully connected layer. Convolutional neural networks have a structure suitable for learning and inference from two-dimensional data and can be trained using a backpropagation algorithm.

In examples of the present disclosure, the convolutional neural network has a kernel for each channel that extracts features of the input image for the channel. The kernel may be organized as a two-dimensional matrix and performs convolutional operations, as it traverses the input data. The size of the kernel can be arbitrary, and the stride at which the kernel traverses the input data can also be arbitrary. The result of the convolution over the entire input data per kernel may be referred to as a feature map or activation map.

In the following, a kernel may include a single set of weights or multiple sets of weights. The number of kernels for each layer may be referred to as the number of channels.

Since a convolutional operation is a combination of input data and kernels, an activation function may then be applied to add nonlinearity. When an activation function is applied to a feature map that is the result of a convolutional operation, it may be referred to as an activation map.

Specifically, referring to FIG. 3, a convolutional neural network may include at least one convolutional layer, at least one pooling layer, and at least one fully connected layer. For example, convolution can be defined by two main parameters: the size of the input data (typically a 1×1, 3×3, or 5×5 matrix) and the depth of the output feature map (the number of kernels). These key parameters can be computed by convolution. These convolutions may start at depth 32, continue to depth 64, and end at depth 128 or 256. The convolution operation may mean an operation of sliding a kernel of size 3×3 or 5×5 over an input image matrix that is input data, multiplying each weight of the kernel and each element of the input image matrix that overlaps, and then adding them all.

An activation function may be applied to the output feature map generated in this way to finally output an activation map. In addition, the weight used in the current layer may be transmitted to the subsequent layer through convolution. The pooling layer may perform a pooling operation to reduce the size of the feature map by down-sampling the output data (i.e., the activation map). For example, the pooling operation may include, but is not limited to, max pooling and/or average pooling.

The maximum pooling operation uses the kernel, and outputs the maximum value in the area of the feature map overlapping the kernel by sliding the feature map and the kernel. The average pooling operation outputs an average value within the area of the feature map overlapping the kernel by sliding the feature map and the kernel. As such, since the size of the feature map is reduced by the pooling operation, the number of weights of the feature map is also reduced.

The fully connected layer may classify data output through the pooling layer into a plurality of classes (i.e., inferenced values), and output the classified class and a score thereof. Data output through the pooling layer forms a three-dimensional feature map, and this three-dimensional feature map may be converted into a one-dimensional vector and input as a fully connected layer.

Referring to FIG. 1A and FIG. 1B, a neural network model processed by the NPU 1000 may be related to image classification and object detection. The input data of the plurality of PEs 400 of the NPU 1000 that processes the neural network model described above may be image data, and the output data of the plurality of PEs 400 may be a plurality of bounding box data for the input image. Each of the plurality of bounding box data may include bounding box coordinate data and class data. The bounding box coordinate data may include height data, width data, x data, and y data.

Assuming that the shape of the bounding box is a rectangle, the bounding box coordinate data includes height data, width data, x data, and y data as described above. However, the shape of the bounding box is not limited to a square, but may be transformed into a pentagon or more polygon or a circle, and accordingly, the number and type of bounding box coordinate data may vary according to the shape of the bounding box. Further, the class data may include a plurality of classes categorized as existing inside the bounding box and a score thereof.

FIG. 4 is a schematic diagram describing energy consumption per unit operation of a NPU, according to one example of the present disclosure. Hereinafter, FIG. 4 will be described with respect to the power consumption reduction technology of the memory 300 of the NPU 1000. Referring to FIG. 4, this is a table schematically explaining energy consumed per unit operation of the NPU 1000. Energy consumption can be divided into memory access, addition operation, and multiplication operation.

"8b Add" refers to an 8-bit integer addition operation of the adder 642. An 8-bit integer addition operation may consume 0.03 pj of energy. "16b Add" refers to the 16-bit integer addition operation of the adder 642. A 16-bit integer addition operation may consume 0.05 pj of energy. "32b Add" refers to a 32-bit integer addition operation of the adder 642. A 32-bit integer addition operation may consume 0.1 pj of energy. "16b FP Add" refers to a 16-bit floating-point addition operation of the adder 642. A 16-bit floating-point addition operation may consume 0.4 pj of energy. "32b FP Add" refers to a 32-bit floating-point addition operation of the adder 642. A 32-bit floating-point addition operation may consume 0.9 pj of energy. "8b Mult" refers to an 8-bit integer multiplication operation of the multiplier 641. An 8-bit integer multiplication operation may consume 0.2 pj of energy. "32b Mult" refers to a 32-bit integer multiplication operation of the multiplier 641. A 32-bit integer multiplication operation may consume 3.1 pj of energy. "16b FP Mult" refers to a 16-bit floating-point multiplication operation of the multiplier 641. A 16-bit floating-point multiplication operation may consume 1.1 pj of energy. "32b FP Mult" refers to a 32-bit floating-point multiplication operation of the multiplier 641. A 32-bit floating-point multiplication operation may consume 3.7 pj of energy. "32b SRAM Read" refers to a read access of 32 bits of data when the memory 300 is a static random access memory (SRAM). Reading 32 bits of data from the memory 300 may consume 5 pj of energy. "32b DRAM Read" refers to a read access of 32 bits of data when the main memory 3000 is DRAM. Reading 32 bits of data from main memory 3000 to memory 300 can consume 640 pj of energy. The unit of energy is the pico-joule (pj).

When the NPU 1000 performs 32-bit floating point multiplication versus 8-bit integer multiplication, the energy consumption per unit operation is approximately 18.5 times different. When reading 32-bit data from the main memory 3000 configured as DRAM and reading 32-bit data from the memory 300 configured as SRAM, the energy consumption per unit operation is approximately 128 times different. In other words, from a power consumption perspective, power consumption increases as the number of bits in the data increases. Also, floating-point operations consume more power than integer operations. Also, reading data from DRAM increases power consumption dramatically.

Therefore, the memory 300 of the NPU 1000 may be embodied as high-speed static memory such as an SRAM tube and not DRAM. However, the neural network processing unit according to examples of the present disclosure is not limited to SRAM. For example, the memory 300 may not include DRAM, and the memory 300 may be configured to include static memory configured to have relatively higher read and write speeds and consume relatively less power than the main memory 3000. Accordingly, the memory 300 of the NPU 1000 according to one example of the present disclosure may be configured to have a relatively higher read and write speed and to consume relatively less power for the inference operations of the neural network model than the main memory 3000.

Static memories that can be driven at high speeds, such as SRAM, may include SRAM, magnetoresistive random access memory (MRAM), spin-transfer torque magnetic random-access memory (STT-MRAM), embedded magnetic random access memory (eMRAM), and orthogonal spin transfer magnetic random access memory (OST-MRAM). Furthermore, MRAM, STT-MRAM, eMRAM, and OST-MRAM are static memories and have non-volatile characteristics. Thus, a static memory capable of high-speed operation, such as SRAM, may beneficially obviate redundancy of providing additional memory to the main memory 3000 for rebooting after a power failure. However, examples according to the present disclosure are not limited thereto.

According to the above-described configuration, the NPU 1000 reduces the power consumption by the DRAM during the inference operation of the neural network model. Furthermore, a memory cell of the SRAM of the memory 300 may comprise, for example, four to six transistors to store one bit of data. However, examples according to the present disclosure are not limited thereto. Further, a memory cell of the MRAM of the memory 300 may comprise, for example, one magnetic tunnel junction (MTJ) and one transistor to store one bit of data. However, examples according to the present disclosure are not limited thereto.

Figure 5:
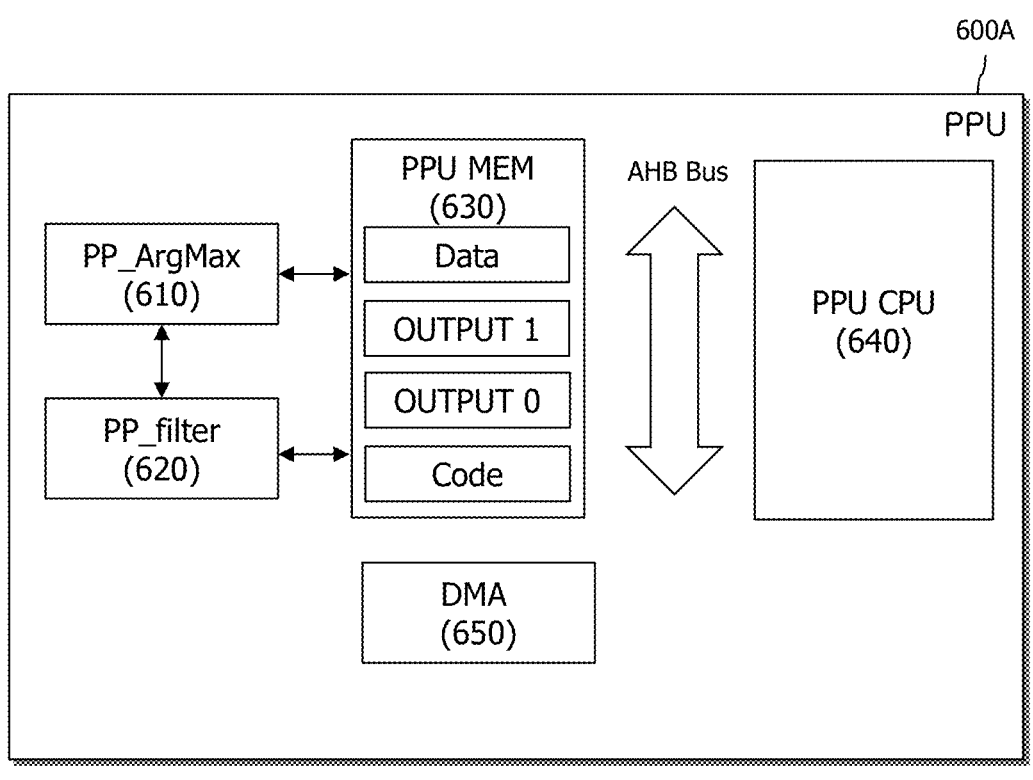
FIG. 5 is a schematic diagram illustrating a post-processing unit according to one example of the present disclosure.

The following describes in detail the specific configuration and operation of PPU 600A that is separate from NPU 1000A, according to one example of the present disclosure. FIG. 5 is a schematic diagram illustrating PPU 600A according to one example of the present disclosure. Referring to FIG. 5, the PPU 600A according to one example of the present disclosure may include, among other components, a first computation unit 610, a second computation unit 620, an internal processing unit 640, an internal memory 630 and a DMA 650.

The first computation unit 610 may extract the highest scoring class of the plurality of classes associated with the one bounding box. The first computation unit 610 may perform a class-argmax operation to extract the index of the class having the highest score in the one bounding box and the class score of that class. The class score indicates, for each class corresponding to an object, the probability that the object is present in the bounding box.

The second computation unit 620 may selectively extract only those bounding boxes of the plurality of bounding boxes having class confidence scores that are above a threshold confidence score. The class confidence score represents probability or confidence that a specific object of a certain class is present in the bounding box. The class confidence score is determined as a product of an object presence confidence score and the class score. The object presence confidence score indicates the probability that an object is present in a bounding box but regardless of what of the classes the object belongs to. The second computation unit 620 performs a bounding box filtering operation to extract only those bounding boxes whose product of the object presence confidence score of the bounding box and the class score extracted from the first computation unit 610 is above a certain threshold confidence score.

The internal processing unit 640 may post-process the data of the extracted bounding boxes in the second computation unit 620; that is, the internal processing unit 640 may decode the data of the extracted bounding boxes. Further, the internal processing unit 640 may perform a non-maximum suppression (NMS) operation on the data of the extracted bounding boxes. The internal processing unit 640 may be referred to as the central processing unit (CPU) of the PPU.

The internal memory 630 may store data required for computations performed by the PPU 600. That is, the internal memory 630 may store data that is input or output from the first computation unit 610, the second computation unit 620, and the internal processing unit 640. The internal memory 630 may be referred to as the memory of the PPU.

The DMA 650 is a circuit that enables PPU 600A to receive processed data or send data for processing via bus 6000. The data to PPU 600A may originate from NPU 1000A or main memory 3000. The data processed by PPU 600A may be sent to NPU 1000A or memory 3000. The DMA 650 supports such data to be transferred efficiently with reduced intervention or no intervention from CPU 2000.

Referring to FIG. 5, the internal memory 630 may include a plurality of memory banks (e.g., DATA, OUTPUT1, OUTPUT2, and Code). A portion (e.g., DATA) of the plurality of memory banks may store a plurality of bounding box data output from the internal processing unit 640. Another portion (e.g., OUTPUT1, OUTPUT2) of the plurality of memory banks may store data on a plurality of bounding boxes received from the first computation unit 610 and the second computation unit 620. The other portion (e.g., Code) of the plurality of memory banks may store code data associated with post-processing data in the internal processing unit 640. However, the data stored in the plurality of memory banks is not limited to the above, and various types of data may be stored as needed.

Meanwhile, the inputs and outputs of the internal processing unit 640 may be transmitted through an advanced high-performance bus (AHB). The AHB refers to a high-performance bus protocol used primarily in system-on-chip (SoC) designs, which has the advantages of low power and scalability, which can improve the reliability and efficiency of the system.

Figure 6:
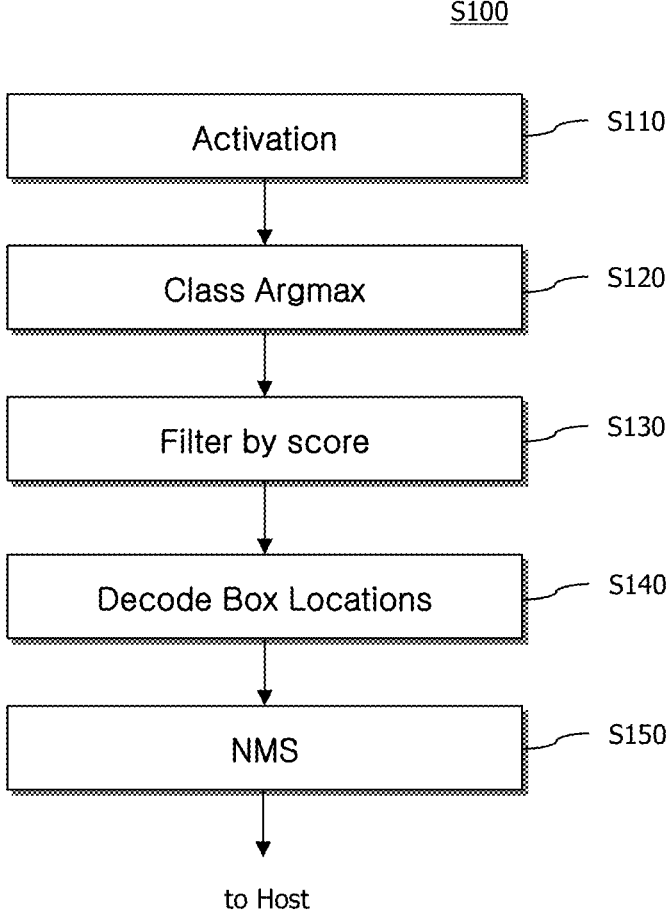
FIG. 6 is a flowchart illustrating a computation process of a neural processing unit and a post-processing unit, according to one example of the present disclosure.

FIG. 6 is a schematic diagram illustrating a computation process of a NPU and a PPU according to one example of the present disclosure. For ease of description, reference will be made to the structure of the NPU 1000A and the PPU 600A shown in FIGS. 1A and 5.

The computation process S100 according to one example of the present disclosure may include an activation function operation step S110, a class-argmax operation step S120, a filtering operation step S130, a decoding operation step S140, and a non-maximum suppression (NMS) operation step S150.

In the activation function operation step S110, the SFU 500 of NPU 1000A may process a number of activation functions for imparting nonlinearity to the output feature map. The activation functions processed by the SFU 500 may include, but are not limited to, a SiLU function, a Softmax function, a sigmoid function, a hyperbolic tangent (tanh) function, a ReLU function, a Leaky ReLU function, a Maxout function, or an ELU function that results in a nonlinear output value with respect to an input value.

On the other hand, not all activation functions may be supported in the NPU 1000. Therefore, the NPU 1000 may be programmed to approximate various activation functions via a piecewise linear function approximation algorithm and piecewise linear function processing circuitry. These activation functions can be optionally applied after the MAC operation. The operational value to which the activation function is applied may be referred to as the activation map.

For example, the SFU 500 may be configured to include circuitry that supports computing of the first order function. For example, the SFU 500 may be configured to include circuitry that supports computing the first order function and the second order function. For example, the SFU 500 may be configured to include circuitry to support first order function, second order function, and logarithmic function. For example, the SFU 500 may be configured to include circuitry to support first order function, second order function, logarithmic function, and exponential function. For example, the SFU 500 may be configured to include at least one of a first order function circuit, a second order function circuit, a third order function circuit, a logarithmic function circuit, an exponential function circuit, or similar function calculation circuits. The SFU 500 may program a particular activation function in different techniques.

Alternatively, the SFU 500 may program a particular activation function only as a first order function. For example, the SFU 500 may program a particular activation function only as a second order function. In other embodiments, the SFU 500 may program the particular activation function only as a third order function, a logarithmic function or an exponential function.

The SFU 500 may be configured to analyze the nonlinearity of the activation function to segment the plurality of segments into different widths. The SFU 500 may also analyze the nonlinearity of the activation function and segment each of the plurality of segments to an optimal width. However, the present disclosure is not limited thereto.

In the present disclosure, the activation function may be implemented in various forms that include characteristic segments. When segmenting an activation function into a plurality of segments, the number and width of the plurality of segments may be varied according to the different forms taken by the activation function.

For example, various activation functions, such as SiLU function, Softmax function, swish function, Mish function, sigmoid function, hyperbolic tangent function, hyperbolic tanh function, SELU function, Gaussian Error Linear Unit (GELU) function, SOFTPLUS function, ReLU function, Leaky ReLU function, Maxout function, ELU function, and the like, have various shapes that are divided into a plurality of characteristic intervals that include substantially linear intervals and/or nonlinear intervals. Accordingly, when approximating a nonlinear activation function in a hardware-processable manner, segmenting it by considering these characteristic intervals can result in a more efficient or close approximation of the activation function corresponding to the characteristics of each activation function. For example, the number and width of the segments may be determined by considering the substantially linear intervals, nonlinear intervals, and the like, Accordingly, in a method for approximating an activation function according to the present disclosure, the concept of segment data is used for segmenting the activation function in consideration of these characteristic intervals of the activation function. The segment data includes discontinuity information of the activation function, derivative data, information of the hardware on which the activation function is processed, and the like, and also includes data processed therefrom.

Figure 7:
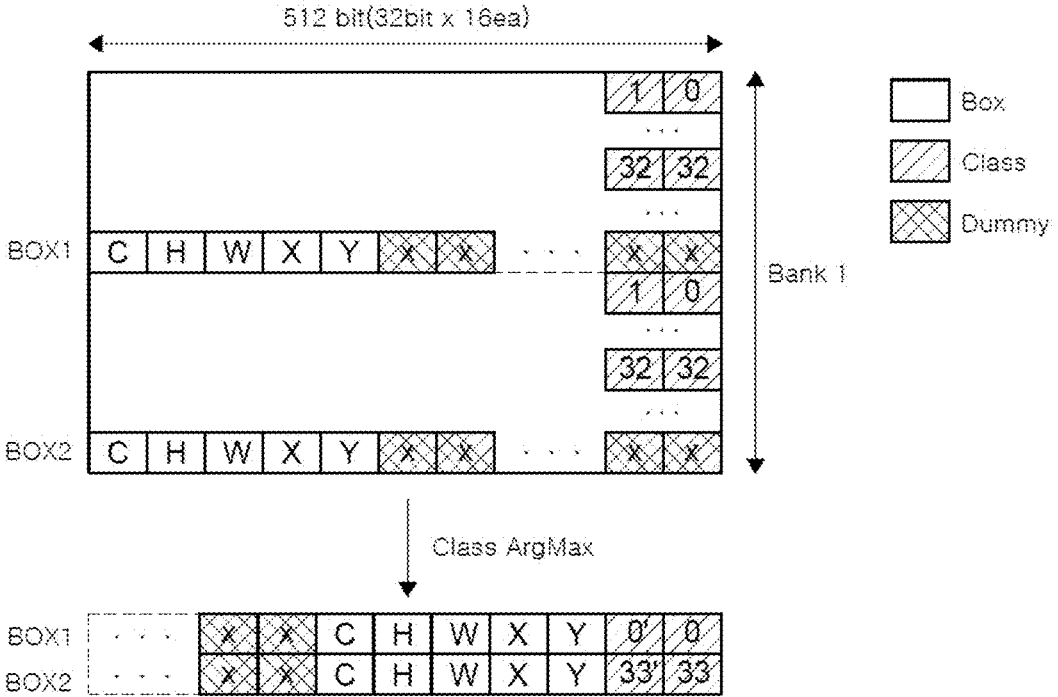
FIG. 7 is a diagram illustrating a class argmax computation step performed by the post-processing unit, according to one example of the present disclosure.

FIG. 7 is a diagram illustrating a class-argmax computation step performed by the PPU, according to one example of the present disclosure. In the class-argmax operation step S120 of FIG. 6, the first computation unit 610 extracts the class with the highest-class score from the plurality of classes included in a bounding box. That is, in the class-argmax operation step S120, the first computation unit 610 performs a class-argmax operation to extract the index of the class with the highest class score in the bounding box and its class score.

Specifically, within one memory bank of the internal memory 630, for each of the plurality of bounding boxes, an object presence confidence score of the bounding box, coordinate of the bounding box, and indices of the multiple classes corresponding to the objects contained in the bounding box, and the score of each class may be stored. Referring to FIG. 7, the memory bank Bank1 may include data for a plurality of bounding boxes. The memory bank Bank1 may include a part of DATA memory bank, a part of OUTPUT1 memory bank, and a part of OUTPUT2 memory bank, described above with reference to FIG. 5. For example, the memory bank Bank1 may include data for a first bounding box BOX1 and data for a second bounding box BOX2. Similarly, the memory bank Bank2, described below with reference to FIG. 14, may include another part of DATA memory bank, another part of OUTPUT1 memory bank and another part of OUTPUT2 memory bank.

It is assumed in the example of FIG. 7 that the shape of the bounding boxes is a rectangle. The data for the first bounding box BOX1 may include an object presence confidence score C predicting an object presence in the first bounding box BOX1, and bounding box coordinate data for the first bounding box BOX1, such as height data H, width data W, x data X, and y data Y. x data X and y data Y indicate the x-coordinate and the y-coordinate of the first bounding box BOX1 in the image, respectively. Further, the data for the second bounding box BOX2 may also include an object presence confidence score C predicting an object presence for the second bounding box BOX2, and the second bounding box coordinate data: height data H, width data W, x data X, and y data Y. The memory bank Bank1 may also include a plurality of dummy data to fill in empty or unused bits in the word width.

The shape of the bounding box is not limited to a rectangle, but may be transformed into a pentagon, a polygonal shape or a circle. The number and type of bounding box coordinate data may vary according to the shape of the bounding box.

The data for the first bounding box BOX1 may include a plurality of class score data 0 to 33 for the objects included in the first bounding box BOX1. For example, an object included in the first bounding box BOX1 may be predicted to be one of several classes, and the data for first bounding box BOX1 may include class score data 0 to 33 of the predicted classes. Further, the data for the second bounding box BOX2 may also include a plurality of class score data (e.g., 0 to 33) for the objects included in the second bounding box BOX2. For example, an object included in the second bounding box BOX2 may be predicted to be one of several classes, and the data for second bounding box BOX2 may include class score data (e.g., 0 to 33) of the predicted classes.

Then, in the class-argmax operation step S120, the first computation unit 610 extracts the highest scoring class among the plurality of classes included in each bounding box. That is, in the class-argmax operation step S120, the first computation unit 610 performs a class-argmax operation to extract the index of the highest scoring class and its class score for the first bounding box BOX1 and those of the second bounding box BOX2. For example, the first computation unit 610 extracts, from the first bounding box BOX1, the first class index 0' and corresponding class score data 0, having the highest score among class score data 0 through 32 associated with the first bounding box BOX1. The first computation unit 610 also extracts, from the second bounding box BOX2, the last class index 33' and corresponding class score data 33, which is the highest class score among the class score data 0 through 33 associated with the second bounding box BOX2. The class index and class score data along with the bounding box coordinate data may be stored in memory bank Bank1. By extracting only the index data and the corresponding score data of one class from each of the bounding boxes BOX1, BOX2 and using or sending the extracted index data and its score data, the first computation unit 610 can reduce the size of data of each bounding box used or sent for subsequent processing. After storing the extracted data to memory bank Bank 1, the remaining data in memory bank Bank 1 is deleted or overwritten by other data and the data in memory bank Bank 1 is subject to subsequent processing. That is, after the extracted data is stored in the memory bank Bank 1, the remaining data in the memory bank Bank 1 is not used. The extracted data in memory bank Bank 1 becomes the target of subsequent processing. In this way, the more efficient use of data space available in internal memory 630 is enabled. Alternatively, instead of moving the bounding box coordinate data, and the extracted class index and class score data to memory bank Bank 1, the memory locations of the bounding box coordinate data, and the extracted class index and class score data may be stored in memory bank Bank 1, which may be later referenced by subsequent processes.

Figure 8:
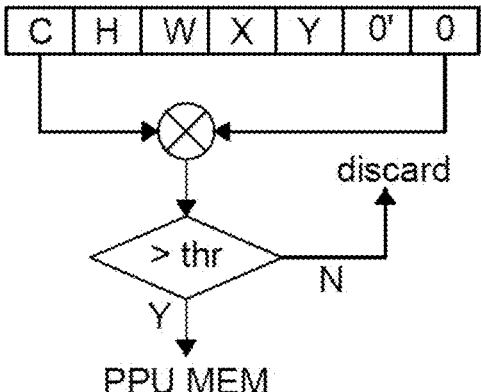
FIG. 8 is a diagram illustrating a filtering computation step performed by the post-processing unit, according to one example of the present disclosure.
Figure 9:
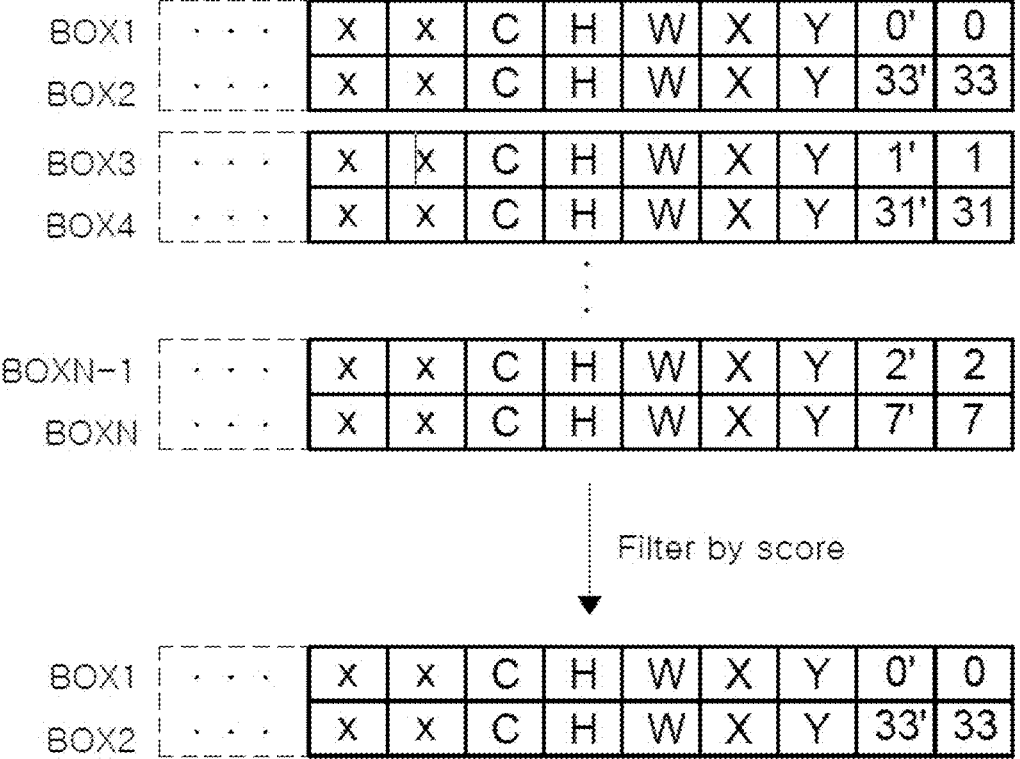
FIG. 9 is a diagram illustrating the result of a filtering operation performed by the post-processing unit, according to one example of the present disclosure.

FIG. 8 is a diagram illustrating a filtering computation step performed by the second computation unit 620 of the PPU on the bounding box BOX1, according to one example of the present disclosure. The process of FIG. 8 is repeated for other bounding boxes as well. FIG. 9 is a diagram illustrating the result of a filtering operation performed by the PPU according to one example of the present disclosure. In the filtering operation step S130, the second computation unit 620 extracts only the bounding boxes having a class confidence score above a threshold confidence score from the plurality of bounding boxes. The class confidence score may correspond to a product of an object presence confidence score C of the bounding box and a class score data extracted from the first computation unit 610. In the example described above with reference to FIG. 7, the class confidence score for BOX1 would be the product of object present score C of BOX1 and class score data 0 of BOX1 while the class confidence score for BOX2 would be the product of object present score C of BOX2 and class score data 33 of BOX2. In the filtering operation step S130, the second computation unit 620 extracts only those bounding boxes whose product of object presence confidence scores C of the bounding boxes and the class score data extracted from the first computation unit 610 are above a certain threshold confidence score thr. The information on the extracted or filtered bounding boxes are then stored in memory bank Bank 1 of the internal memory 630. The information on the extracted or filtered bounding boxes may include the bounding box coordinate data, the class index and the class score. Alternatively, memory bank Bank 1 may store the memory locations of the bounding box coordinate data, and the extracted class index and class score data of the filtered for further processing. In the filtering operation step S130, the second computation unit 620 does not store in memory bank Bank 1 the data for the bounding boxes whose product of the object presence confidence score C of the bounding box and the class score 0 extracted from the first computation unit 610 is less than or equal to the certain threshold confidence score thr. Only the data of the filtered bounding boxes may be subject to further processing. In this way, the amount of processing for the subsequent processing may be reduced.

In FIG. 9, it is assumed that there are N number of bounding boxes that have completed the class-argmax operation in the first computation unit 610. Accordingly, in the filtering operation step S130, the second computation unit 620 may extract only two bounding boxes among the N bounding boxes whose product of the object presence confidence score C and the class score data extracted from the first computation unit 610 is greater than a certain threshold confidence score thr. Only the data for the two filtered bounding boxes are subsequently processed by the internal processing unit. Accordingly, the size of data to be processed by the internal processing unit 640 may be reduced, allowing the internal processing unit 640 to perform operations at a faster speed using smaller memory. Thus, the performance of the PPU may be improved because it depends on the computation speed of the internal processing unit 640.

Figure 10:
FIG. 10 is a diagram illustrating a decoding step performed by the post-processing unit, according to one example of the present disclosure.

FIG. 10 is a diagram illustrating a decoding step performed by a PPU, according to one example of the present disclosure. In a subsequent decoding step S140 of FIG. 6, the internal processing unit 640 may decode the data in the filtered bounding boxes. Specifically, referring to FIG. 10, the bounding box coordinate data is decoded so that it can be processed in the non-maximum suppression (NMS) operation step S150 of FIG. 6 that is subsequently performed by multiplication, addition, and subtraction operations of the height data H, width data W, x data X, and y data Y corresponding to the bounding box.

Figure 11:
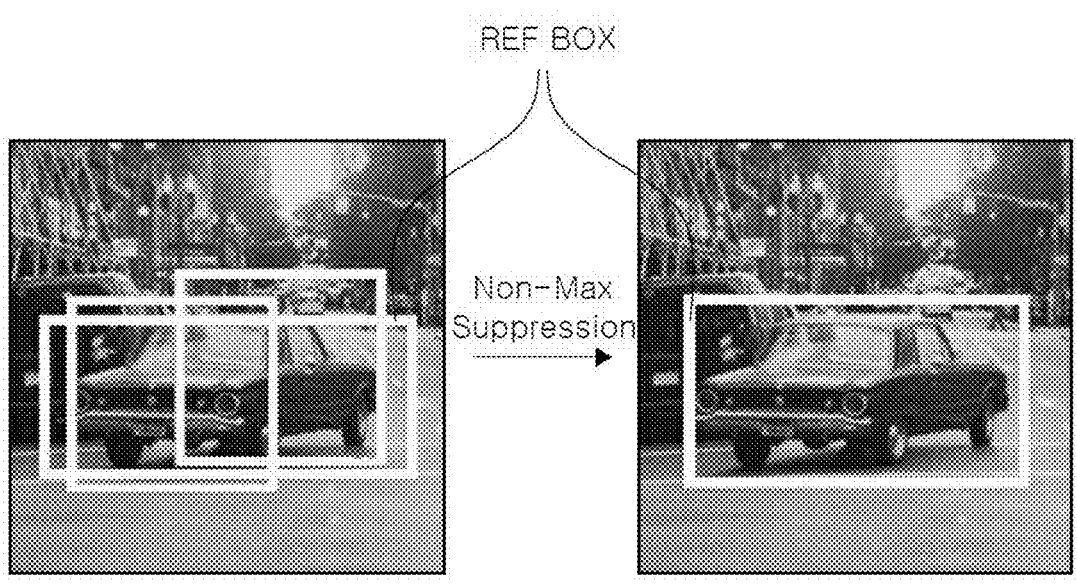
FIG. 11 is a diagram illustrating a non-maximum suppression (NMS) operation step performed by the post-processing unit, according to one example of the present disclosure.

FIG. 11 is a diagram illustrating an NMS operation step performed by the PPU, according to one example of the present disclosure. Subsequently, in the NMS computation step S150, the redundant or overlapping bounding boxes generated by the second computation unit 620 may be removed. The NMS refers to a post-processing step used in object detection tasks to remove redundant or overlapping bounding boxes generated by object detection algorithms, typically in neural network models such as You Only Look Once (YOLO) or Faster R-CNN. Through the NMS computation step, duplicative bounding boxes may be removed and only non-duplicate bounding boxes can be retained for further processing.

The NMS computation step can be broken down to include a confidence score sorting step and a deduplication step. First, in the confidence score sorting step, the bounding box data is sorted based on the confidence score, which is the product of the object presence confidence score of the bounding box and the class score. In one embodiment, the data of the bounding boxes with the highest confidence score is sorted first, and the remaining bounding boxes are sorted in a descending order of the confidence score.

In the deduplication step, the bounding box with the highest confidence score is used as the reference, and the degree of overlap between the bounding box with the highest confidence score and other bounding boxes is determined. The degree of overlap between a bounding box (REF BOX) having the highest confidence score and another bounding box is typically measured using the Intersection over Union (IoU), which is the ratio of the overlap and union area between two bounding boxes. If the IoU between the bounding box (REF BOX) with the highest confidence score and the other bounding box exceeds a predefined threshold (for example, 0.5 or more), this indicates that there is significant overlap between the two boxes, and thus the other bounding box is removed. The removal of the other bounding box is performed by deleting the data associated with the other bounding box from internal memory 630 or making space of internal memory 630 occupied by the data available for overwriting by other data. If the IoU between the bounding box (REF BOX) with the highest confidence score and the other bounding boxes is equal to or below a predefined threshold (for example, 0.5 or more), the other bounding box is retained. Through the non-maximum suppression (NMS) computation step, redundant bounding boxes can be removed from internal memory 630 and non-redundant bounding boxes can be retained, thereby improving the accuracy and reliability of the object detection system.

Figure 12:
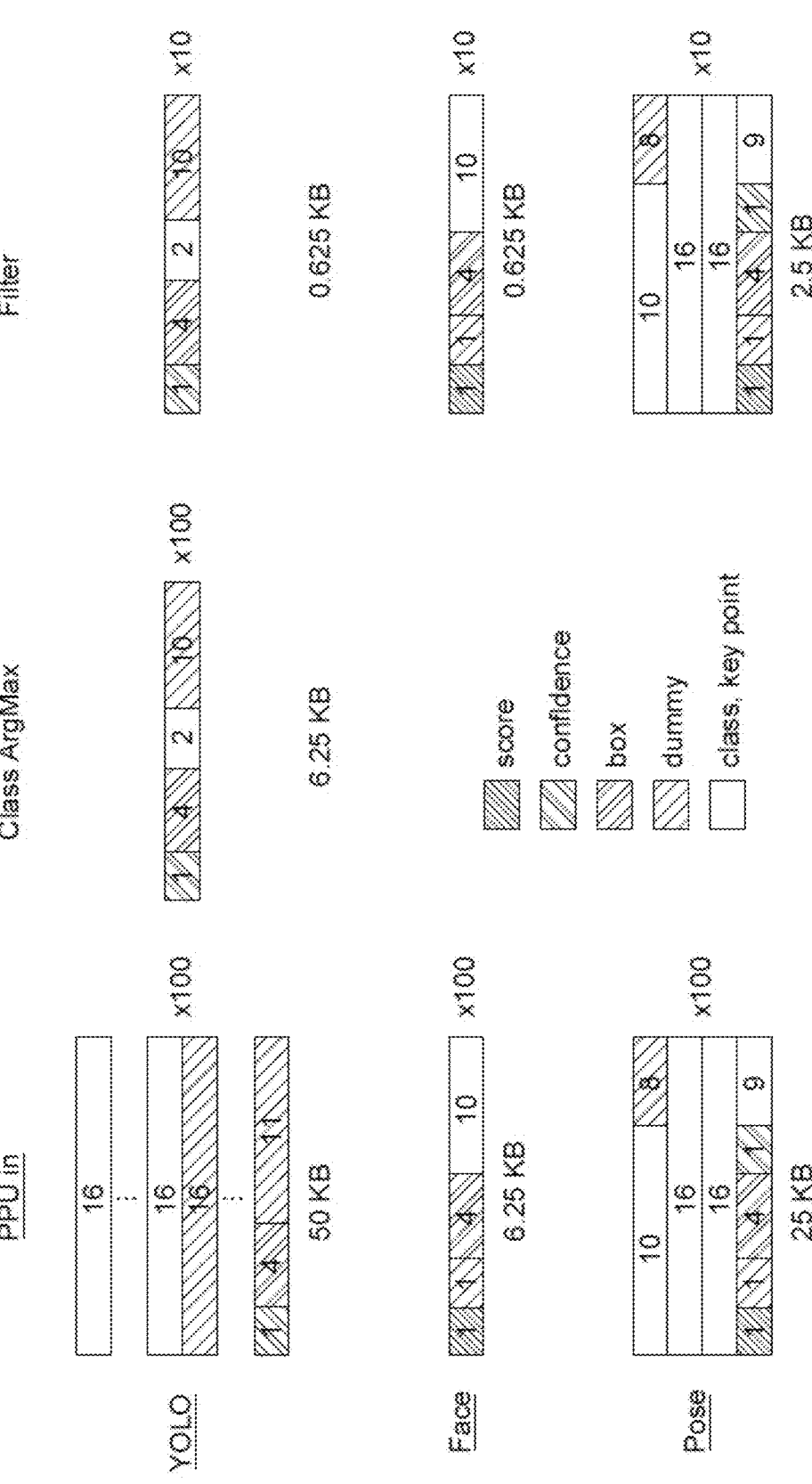
FIG. 12 is a diagram illustrating a data reduction amount of a neural processing unit cooperating with a post-processing unit, according to one example of the present disclosure.

FIG. 12 is a diagram illustrating the amount of data reduced in the PPU, according to one example of the present disclosure. In FIG. 8, data fields and their sizes for a single bounding box in the neural network models of YOLO, face and pose, the overall size of the data for the neural network models, and the reduction of the size of the data after performing filtering operation or a class-argmax operation in combination with the filtering operation are illustrated.

Taking the top example of using the neural network model of YOLO, the PPU may be input with 50 KB of data for each of the 100 bounding boxes, including an object presence confidence score and an index of a plurality of classes and a class score for the object contained inside the bounding box.

Then, in the class-argmax operation step, the first computation unit 610 performs a class-argmax operation to extract the index of the highest scoring class and the class score for each of the 100 bounding boxes, thereby reducing the plurality of class data (class, key point) to two. As a result, the size of the data is reduced from 50 KB to 6.25 KB as an example. In the filtering operation step, the second computation unit 620 may filter the number of bounding boxes from 100 to 10 by removing the bounding boxes whose product of the object presence confidence score of the bounding box and the class score extracted from the first computation unit 610 is below a certain threshold confidence score thr, thereby reducing the size of the data from 6.25 KB to to 0.625 KB.

In the next example where the neural network model is a face recognition model Face, in the filtering operation step, the second computation unit 620 may filter the number of bounding boxes from 100 to 10 by removing bounding boxes having a confidence score below a certain threshold confidence score thr, thereby reducing the size of the data from 6.25 KB to 0.625 KB. In this example, there is no separate reduction performed by a class-argmax operation.

In the bottom example, the neural network model is a pose detection model Pose. In the filtering operation step, the second computation unit 620 may filter the number of bounding boxes from 100 to 10 by removing the bounding boxes in which the product of the object presence confidence score and the class score is below a certain threshold confidence score (thr), thereby reducing the size of the data from 25 KB to 2.5 KB. In this example, there is also no separate reduction performed by a class-argmax operation.

Figure 13A:
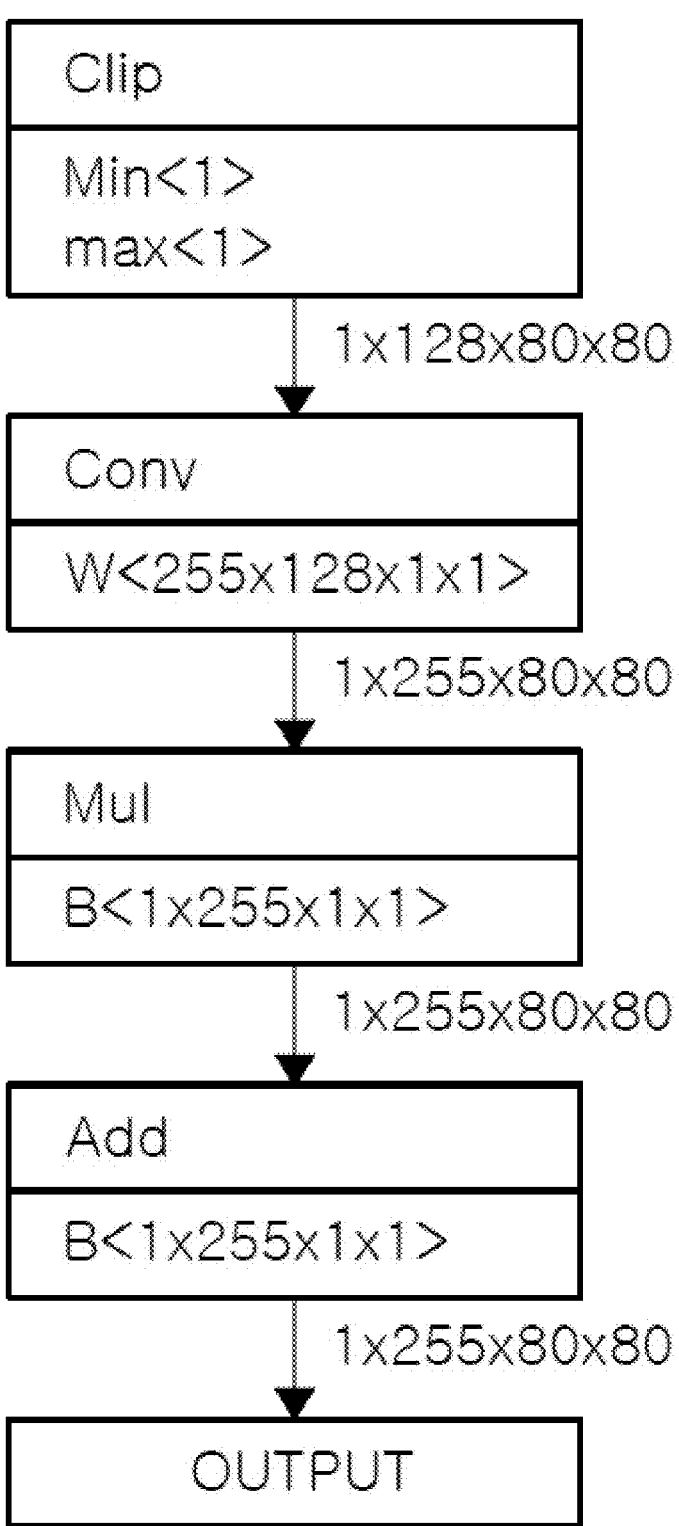
FIG. 13A is a diagram of a directed acyclic graph (DAG) representation of an object detection neural network model input to a neural processing unit cooperating with a post-processing unit, according to one example of the present disclosure.
Figure 13B:
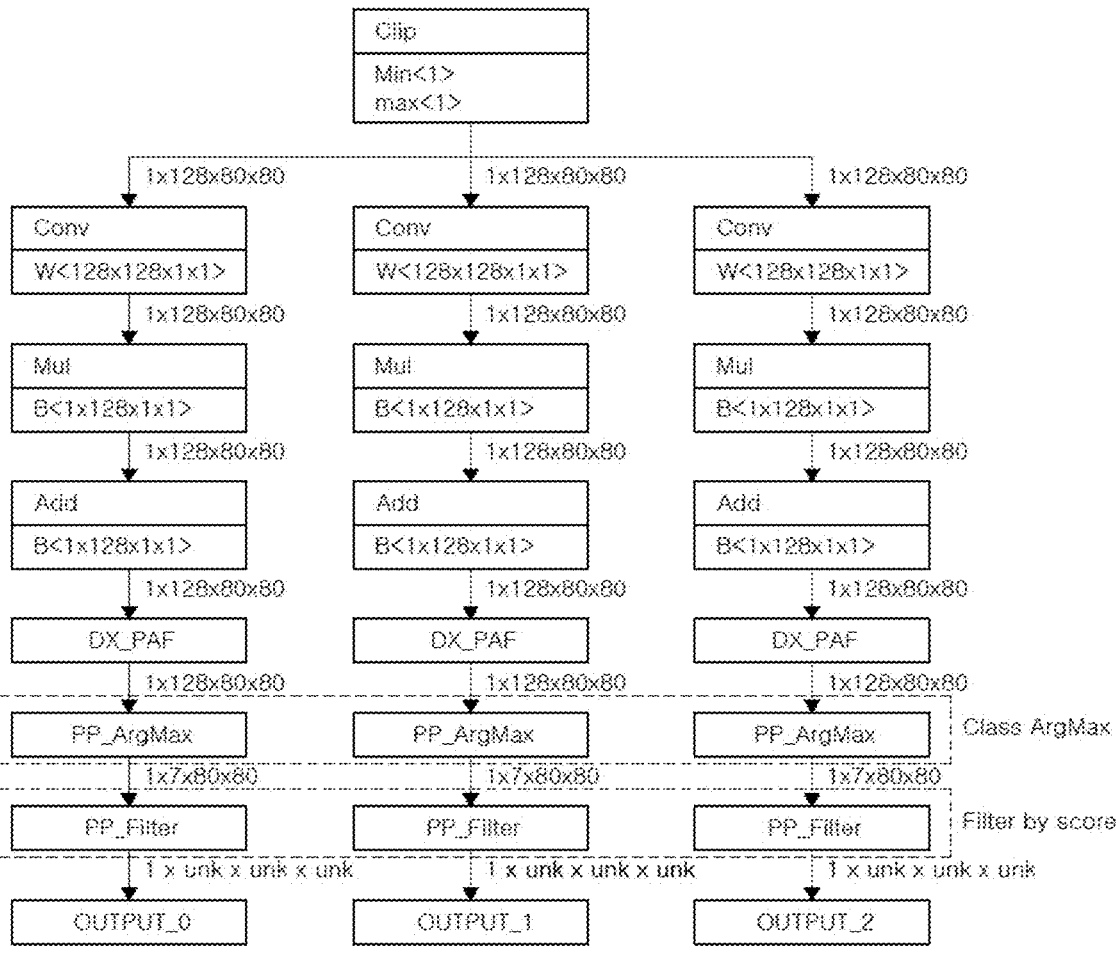
FIG. 13B is a DAG representation of an object detection neural network model that is post-processed in a neural processing unit cooperating with a post-processing unit, according to one example of the present disclosure.

FIG. 13A is a diagram of a directed acyclic graph (DAG) representation of an object detection neural network model input to a NPU including a PPU, according to one example of the present disclosure. FIG. 13B is a diagram of a directed acyclic graph (DAG) representation of an object detection neural network model that is post-processed in a NPU and a PPU, according to one example of the present disclosure.

An object recognition neural network model represented by a DAG can be composed of multiple layers and nodes connected to the multiple layers. As illustrated in FIG. 13A, the object detection neural network model may include a convolutional layer Conv, a multiplication layer Mul, and an addition layer Add operations. Specifically, the output of the convolutional layer Conv may be 255 channels of 80×80 bounding box data, the output of the multiplication layer Mul may be 255 channels of 80×80 bounding box data, and the output of the addition layer Add may be 255 channels of 80×80 bounding box data.

As shown in FIG. 13B, when the PPU 600 is applied according to one example of the present disclosure, the object detection neural network model may include a convolutional layer Conv, a multiplication layer Mul, and an addition layer Add, and may further include a programmed activation function layer DX_PAF, a class argmax layer PP_Argmax, and a filter layer PP_Filter. That is, in the NPU and the PPU 600 according to one example of the present disclosure, the compiler may modify the object detection neural network model shown in FIG. 13A to further include a programmed activation function layer (DX_PAF), a class argmax layer (PP_Argmax), and a filter layer (PP_Filter) shown in FIG. 13B. The compiler may modify or improve the neural network model according to hardware information of the NPU 1000 (e.g., the presence of the PPU 600 or the presence of the SFU 500, and the like) to use dedicated circuitry (e.g., the PPU or SFU) provided in the NPU 1000 and PPU 600 for accelerated computation on the NPU 1000.

In FIG. 13B, for example, the number of types of anchor boxes of bounding boxes is three, so three convolution layers Conv, three multiplication layers Mul, three addition layers Add, three programmed activation function layers DX_PAF, three class argmax layers PP_Argmax, and three filter layers PP_Filter are shown. The An anchor box is a predefined bounding box used in object detection to generate candidate regions of various sizes and aspect ratios for identifying objects at specific locations. The number of each layer may vary according to the number of types of anchor boxes of bounding boxes.

In FIG. 13B, the output of the convolutional layer Conv may be 128 channels of 80×80 bounding box data, the output of the multiplication layer Mul may be 128 channels of 80×80 bounding box data, and the output of the addition layer Add may be 128 channels of 80×80 bounding box data. However, as described above, the size of the bounding box data output from the class-argmax layer PP_Argmax is reduced so that seven channels of 80×80 bounding box data including the object presence confidence score, bounding box coordinate data, and class data that predicted the object presence is retained in internal memory 630 while removing others are discarded from internal memory 630.

Then, by processing in the filter layer PP_Filter, only the bounding box data whose class confidence score is above the threshold confidence score among the 80×80 bounding box data of 7 channels can be retained in internal memory 630 and the remaining data may be discarded from internal memory 630.

Figure 14:
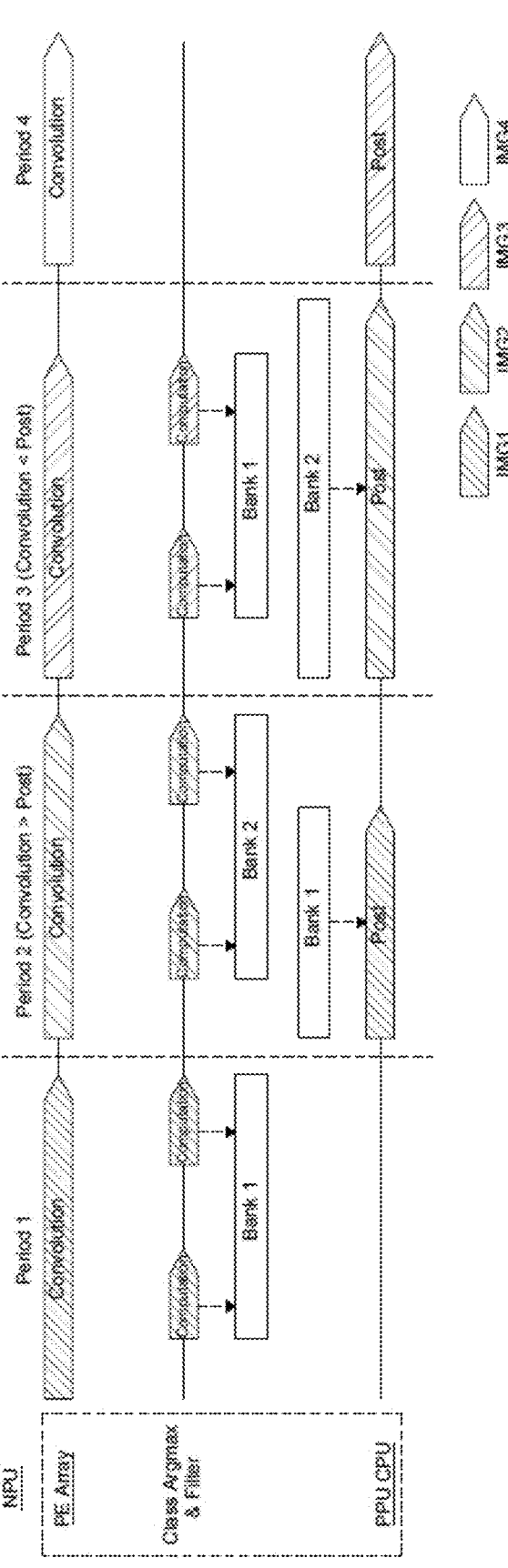
FIG. 14 is a timing diagram illustrating a plurality of image data computation processes of a neural processing unit cooperating with a post-processing unit, according to one example of the present disclosure.

FIG. 14 is a timing diagram illustrating a plurality of image data computation processes of a NPU including a PPU, according to one example of the present disclosure. FIG. 14 illustrates a process of computing a plurality of image data in a NPU, divided into a first period Period1 in which a first image data IMG1 is received by the NPU, a second period Period2 in which a second image data IMG2 is received by the NPU, a third period Period3 in which a third image data IMG3 is received by the NPU, and a fourth period Period4 in which a fourth image data IMG4 is received by the NPU.

In Period1 of FIG. 14, the plurality of PEs performs convolution operations on the first image data IMG to output data for a plurality of bounding boxes for the first image data IMG1. While the plurality of PEs performs the convolution operation, the first computation unit 610 of the PPU performs a class-argmax operation on the outputted plurality of bounding box data, and the second computation unit 620 of the PPU performs a filtering operation on the bounding box data. In FIG. 14, "computation" means the class-argmax operation and filtering operation. The data of the bounding boxes in the first image data IMG1, which is the output of the first computation unit 610 and the second computation unit 620, may be stored in the first memory bank Bank 1 of the internal memory 630.

Period2 begins after the plurality of PEs finishes performing the convolution operations on the first image data IMG1. In Period2, the plurality of PEs performs convolution operations on the second image data IMG2 to output data on a plurality of bounding boxes in the second image data IMG2. While the plurality of PEs performs the convolution operation, the first computation unit 610 performs a class-argmax operation on the outputted plurality of bounding box data, and the second computation unit 620 performs a filtering operation on the bounding box data. The data of the bounding boxes in the second image data IMG2, which is the output of the first computation unit 610 and the second computation unit 620, may be stored in the second memory bank Bank2 of the internal memory 630. Meanwhile, the internal processing unit 640 performs decoding and NMS operations Post on the data of the bounding boxes of the first image data IMG1, which is the previous image data received from the first memory bank Bank1. In Period2, because the convolution operation time of the plurality of PEs takes longer than the decoding and NMS operation time of the internal processing unit 640, Period3 begins after the plurality of PEs finishes convolution operations on the second image data IMG2.

In Period3 of FIG. 14, the plurality of PEs performs convolution operations on the third image data IMG3 to output data on a plurality of bounding boxes in the third image data IMG3. While the plurality of PEs performs the convolution operations, the first computation unit 610 performs a class-argmax operation on the outputted plurality of bounding box data, and the second computation unit 620 performs a filtering operation on the bounding box data.

Then, the data of the bounding boxes in the third image data IMG3, which is the output of the first computation unit 610 and the second computation unit 620, may be stored in the first memory bank Bank 1 of the internal memory 630.

Meanwhile, in Period3 of FIG. 14, while the plurality of PEs performs the convolution operations, the internal processing unit 640 performs decoding and NMS operations Post on the data of the bounding boxes of the second image data IMG2 input from the second memory bank Bank2. Because the decoding and NMS the operation time for the internal processing unit 640 take longer than the convolution time of the plurality of PEs in Period3, Period4 begins after the internal processing unit 640 finishes decoding and NMS operations on the data in the bounding boxes of the second image data IMG2.

In Period4, the plurality of PEs performs convolution operations on the fourth image data IMG4, outputting data on multiple bounding boxes in the fourth image data IMG4, identical to the sequence of operations described in Period2.

While the plurality of PEs performs the convolution operations, the first computation unit 610 performs a class-argmax operation on the outputted plurality of bounding box data, and the second computation unit 620 performs a filtering operation. Further, while the plurality of PEs performs the convolution operations, the internal processing unit 640 performs decoding and NMS operations Post on the data of the bounding boxes of the third image data IMG3.

Again, at the later of the time when the internal processing unit 640 finishes performing the non-maximum suppression (NMS) operation on the first image data IMG1 and the time when the plurality of PEs finishes performing the operation on the second image data IMG2, the plurality of PEs starts performing the operation on the third image data, or the internal processing unit 640 performs the decoding and NMS operation Post on the data in the bounding boxes of the second image data IMG2.

As described above, the NPU including the PPU according to the present disclosure may perform a class-argmax operation by the first computation unit 610 and a filtering operation by the second computation unit 620 on the outputted plurality of bounding box data while the plurality of PEs performs a convolution operation. Accordingly, the NPU including the PPU according to the present disclosure may reduce the processing time of the post-processing operation because the time for the class-argmax operation and the filtering operation, which are part of the post-processing operation, is not required separately. In other words, a NPU comprising a PPU according to the present disclosure will only need time separately for the decoding and NMS operations, which are different parts of the post-processing operation, and will not need time separately for the class-argmax operation and the filtering operation, which are different parts of the post-processing operation.

Specifically, if the post-processing operation performed by the PPU, including a class-argmax operation, a filtering operation, a decoding operation, and an NMS operation are all performed, the size of the data that the post-processing operation processes may be 8.2 MB, and the data processing time may be 24 ms. On the other hand, if only decoding and NMS operations are performed during the post-processing operation, the size of the data that the post-processing operation processes may be 128 KB, and the data processing time may be 1.29 ms.

The NPU and the PPU according to the present disclosure has the benefit of the first computation unit 610 performing a class-argmax operation on the outputted data of a plurality of bounding boxes and the second computation unit 620 performing a filtering operation while the plurality of PEs performs convolution operations, so that the additional time required for the post-processing operation and the amount of data to be processed may be reduced. Thus, it has the advantage of, among others, improving the computation speed of the NPU and the PPU according to the present disclosure.

Furthermore, while the plurality of PEs performs the convolution operation, the internal processing unit 640 may perform decoding and NMS operations on the data of the bounding boxes of the previous image data. As a result, the decoding and NMS operations during the post-processing operation of the previous image data may overlap with the convolution operation time of the subsequent image data, which has the advantage that the computation speed of the NPU may be further improved.

Figure 15:
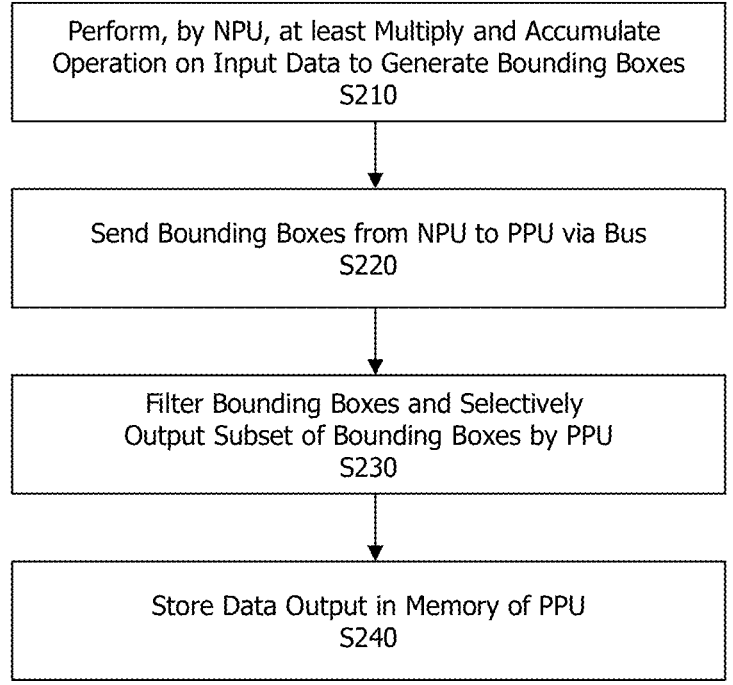
FIG. 15 is a flowchart of a method for performing operations associated with a neural network model, according to one example of the present disclosure.

FIG. 15 is a flowchart of a method for performing operations associated with a neural network model. At least multiply and accumulate operations on an input data to generate a plurality of bounding boxes is performed S210 by the NPU. The bounding boxes are sent S220 from the NPU to a post-processing circuit via a bus. The bounding boxes are filtered S230 and a subset of the bounding boxes that satisfy a predetermined condition as data output by the post-processing circuit are outputted. The data output is stored S240 in a memory of the PPU.

According to an example of the present disclosure, a NPU may be provided.

The NPU may comprise a plurality of PEs configured to perform operations of a neural network model. The NPU may comprise a SFU configured to perform activation function operations on the data output from the plurality of PEs. A PPU separate from the NPU is provided to process data output from the NPU.

The neural network model may be an object detection model, the data output from the plurality of PEs may include data of a plurality of bounding boxes for image data, and each of the data of the plurality of bounding boxes may include an object presence confidence score, bounding box coordinate data, and class data.

The PPU may include a first computation unit configured to extract a highest-scoring class of a plurality of classes included in each of a plurality of bounding boxes, and a second computation unit configured to extract one or more bounding boxes from the plurality of bounding boxes that have a class confidence score equal to or greater than a threshold confidence score. The class confidence score may be a product of an object presence confidence score of the bounding box and a class score extracted by the first computation unit.

The PPU may include a first computation unit configured to perform a class-argmax operation that extracts an index of a class having a highest score and a class score thereof for a plurality of bounding boxes, and a second computation unit configured to perform a bounding box filtering operation configured to extract one or more bounding boxes having a product of an object presence confidence score of the bounding box and a class score extracted from the first computation unit, equal to or greater than a threshold confidence score.

The PPU may include an internal memory configured to store the data output from the first computation unit and the second computation unit.

The internal memory may include a plurality of memory banks, a portion of the plurality of memory banks may be configured to store output data of the first computation unit, and another portion of the plurality of memory banks may be configured to store output data of the second computation unit.

While the plurality of PEs is performing an operation, the first computation unit may perform the class-argmax operation, and the second computation unit may perform the bounding box filtering operation.

The PPU may include an internal processing unit configured to perform an NMS operation for a plurality of extracted bounding boxes, and through the NMS operation, redundant bounding boxes among the plurality of extracted bounding boxes may be removed.

While the plurality of PEs performs an operation on subsequent image data, the internal processing unit may perform the NMS operation on previous image data.

The internal processing unit may be configured to start the NMS operation for subsequent image data from the later of a completion time of the internal processing unit processing the NMS operation for previous image data and a completion time of the plurality of PEs processing the subsequent image data following the previous image data.

The plurality of PEs may be configured to start an operation for third image data from the later of a completion time of the internal processing unit processing the NMS operation for first image data and a completion time of the plurality of PEs processing second image data following the first image data.

The NPU may comprise a compiler configured to add a class-argmax layer and a filtering layer to an input neural network model.

Embodiments relate to an NPU including a plurality of PEs circuit, and a subsequent circuit. The plurality of PEs circuit generates data output by performing convolution operations of a neural network model. A PPU separate from the NPU is coupled to the NPU to receive the data output and extracts a subset of the data output.

In one or more embodiments, the data output includes, for each bounding box in a region of an image, class scores indicative of probability that classes of objects being presenting in each bounding box.

In one or more embodiments, the post-processing circuit includes a first computation circuit that selects one or more classes for each bounding box as the subset of the data output by comparing class scores of classes for each bounding box.

In one or more embodiments, the post-processing circuit further includes a second computation circuit that extracts one or more bounding boxes by comparing a class confidence score of each bounding box with a threshold confidence score. The class confidence score represents probability that an object of a class is present in each bounding box. The class confidence score is derived from the object presence confidence score and the class scores.

In one or more embodiments, the second computation circuit computes the class confidence score as a product of the object presence confidence score and a class score with the subset of classes extracted by the first computation circuit.

In one or more embodiments, the post-processing circuit further includes an internal memory coupled to the first computing circuit and the second computation circuit. The internal memory stores the subset of classes for each bounding box extracted by the first computation circuit, and stores data of the one or more bounding boxes extracted by the second computation circuit.

In one or more embodiments, the post-processing circuit further includes an internal processing circuit that performs a non-maximum suppression (NMS) operation on the one or more bounding boxes extracted by the second computation circuit.

In one or more embodiments, the internal processing circuit performs the NMS operation during a period in which the plurality of PEs performs the convolution operations.

In one or more embodiments, the internal processing circuit starts the NMS operation for a subsequent image subsequent to the image at a time that is later of (i) a completion time of the NMS operation for the image data and (ii) a completion time of the convolution operations on the image by the plurality of PEs circuit.

In one or more embodiments, the data output further includes coordinate data of each bounding box.

In one or more embodiments, the post-processing circuit further includes an internal memory that stores the subset of classes for each bounding box extracted by the first computation circuit.

In one or more embodiments, the first computation circuit performs the comparison of the class scores during a period in which the plurality of PEs circuit performs the convolution operations.

In one or more embodiments, the neural processing circuit further includes one or more processors, and memory. The memory stores instructions of a compiler. The instructions when executed by the one or more processors cause adding a class-argmax layer to generate the neural network model. The extracting of the subset of classes by the first computation circuit corresponds to operations of the class-argmax layer.

Embodiments relate to a PPU. The PPU may be implemented in register transfer level (RTL) code and designed to interface with a NPU (NPU) configured for object detection computations of a neural network model. The PPU may include a processing unit configured to filter a plurality of bounding boxes transmitted from the NPU and output only those that satisfy a particular condition and one or more input registers configured to store data output from the processing unit.

In one or more embodiments, the data may include one or more of an object presence confidence score indicating a probability that an object is present in each bounding box of the plurality of bounding boxes, a coordinate of each bounding box of the plurality of bounding boxes, and a class associated with each bounding box of the plurality of bounding boxes.

In one or more embodiments, the particular condition may comprise a class having a highest score among a plurality of classes and a class confidence score greater than or equal to a threshold confidence score.

In one or more embodiments, the class confidence score may be a product of an object presence confidence score and a score of the class.

In one or more embodiments, the PPU may include a memory unit configured to store an intermediate result and a final result of the processing unit.

In one or more embodiments, the memory unit may comprise a plurality of memory registers, and an address generation logic for accessing the plurality of memory registers.

In one or more embodiments, the PPU may be configured to perform a non-maximum suppression (NMS) operation on the plurality of bounding boxes.

In one or more embodiments, the NMS operation may be performed to remove redundant or overlapping bounding boxes of the plurality of bounding boxes.

In one or more embodiments, the NPU may comprise a plurality of PEs configured to perform operations of the neural network model, and a special function unit configured to receive output data of the plurality of PEs to perform activation function operations.

Embodiments relate to a circuit for a PPU. The circuit is configured to interface with a NPU (NPU) configured for object detection computations of a neural network model. The circuit may include a memory circuit configured to store data, of a plurality of bounding boxes, output from the NPU, and a processing circuit configured to filter the plurality of bounding boxes and output only those that satisfy a particular condition.

In one or more embodiments, the processing circuit may comprise a first computation circuit configured to output a highest scoring class of a plurality of classes included in each of the plurality of bounding boxes, and a second computation circuit configured to output one or more bounding boxes of the plurality of bounding boxes having a class confidence score above a threshold value.

In one or more embodiments, the processing circuit may comprise a first computing circuit configured to process a class-argmax operation to extract an index of a class having highest score and a score of the class from each of the plurality of bounding boxes.

In one or more embodiments, the processing circuit may comprise a second computing circuit configured to process a bounding box filtering operation to extract one or more bounding boxes from the plurality of bounding boxes for which a product of an object presence confidence score and the score of the class extracted by the first computation circuit is above a threshold value.

In one or more embodiments, the memory circuit may comprise a plurality of memory banks. A portion of the plurality of memory banks may be configured to store output data of the first computing circuit. Another portion of the plurality of memory banks may be configured to store output data of the second computing circuit.

In one or more embodiments, the processing circuit cooperating with the NPU may be configured to perform a non-maximum suppression (NMS) operation on the plurality of bounding boxes.

The examples of the present disclosure disclosed herein and in the drawings are provided solely to explain the technical content of the present disclosure and to facilitate understanding of the present disclosure, and are not intended to limit the scope of the present disclosure. It will be apparent to one of ordinary skill in the art to which the present disclosure belongs that other modifications based on the technical ideas of the invention may be practiced in addition to the examples shown herein.

National R&D Project Supporting This Invention

[Project Identification Number] Not assigned
[Task Number] 00399936
[Name of Ministry] Ministry of Science and ICT
[Name of Task Management (Specialized) Institution] Institute of Information & Communications Technology Planning & Evaluation
[Research Project Title] Development of Unified Software Flatform of Semiconductor Technology Applicable for Artificial Intelligence
[Research Task Name] Development of Quality Performance Evaluation Test (BMT) Platform Technology for Edge AI Semiconductors
[Name of the organization performing the task] DeepX Co., Ltd.
[Research Period] 2024 Apr. 1~2027 Dec. 31

What is claimed is:

1. A post-processing circuit, comprising:
an access circuit configured to communicate with a neural processing unit (NPU) via a bus, the NPU processing:
in a first period, a first image or a first portion of the image to generate a first plurality of bounding boxes, and
in a second period subsequent to the first period, a second image or a second portion of the image to generate a second plurality of bounding boxes;
a processing circuit configured to:
receive the first plurality of bounding boxes and filter the first plurality of bounding boxes in the first period to selectively output a subset of the first plurality of bounding boxes that satisfy a predetermined condition as data output corresponding to the first image or the first portion of the image, receive the second plurality of bounding boxes and filter the second plurality of bounding boxes in the second period to selectively output a subset of the second plurality of bounding boxes that satisfy the predetermined condition as data output corresponding to the second image or the second portion of the image, and perform hypothesis suppression on the data output corresponding to the first image or the first portion of the image in the second period; and memory configured to store the data output from the processing circuit.

2. The post-processing circuit of claim 1, wherein the data output comprises, for each of the first bounding boxes, class scores indicative of probability that classes of objects being present in each of the first bounding boxes.

3. The post-processing circuit of claim 2, further comprising a first computation circuit configured to select one or more classes for each of the first bounding boxes as the subset of the data output by comparing class scores of classes for each of the first bounding boxes.

4. The post-processing circuit of claim 3, further comprising:

a second computation circuit configured to extract one or more of the first bounding boxes by comparing a class confidence score of each of the first bounding boxes with a threshold confidence score, the class confidence score representing probability that an object of a class is present in each of the first bounding boxes and derived from an object presence confidence score and the class scores, the object presence confidence score included in the data output and indicative of probability that an object is present in each of the first bounding boxes.

5. The post-processing circuit of claim 4, wherein the second computation circuit is configured to determine the class confidence score as a product of the object presence confidence score and a class score with the subset of classes extracted by the first computation circuit.

6. The post-processing circuit of claim 3, wherein the memory is further configured to store the subset of classes for each of the bounding boxes extracted by the first computation circuit.

7. The post-processing circuit of claim 6, wherein the memory comprises:

a plurality of memory registers; and an address generation logic for accessing the plurality of memory registers.

8. The post-processing circuit of claim 4, wherein the processing circuit is configured to perform a non-maximum suppression (NMS) operation to perform the hypothesis suppression on the one or more bounding boxes extracted by the second computation circuit to remove redundant or overlapping bounding boxes of the plurality of first bounding boxes.

9. A system comprising:

a bus;

a neural processing unit (NPU) coupled to the bus and configured to:

perform at least multiply and accumulate operations on a first input data to generate a plurality of first bounding boxes in a first period, and perform at least multiple and accumulate operations on a second input data to generate a plurality of second bounding boxes in a second period subsequent to the first period; and a post-processing circuit coupled to the bus and comprising:

an access circuit configured to communicate with the NPU via the bus to receive the first plurality of bounding boxes and the second plurality of bounding boxes, a processing circuit configured to:

receive the first plurality of bounding boxes and filter the first plurality of bounding boxes in the first period to selectively output a subset of the first bounding boxes that satisfy a predetermined condition as data output corresponding to the first input data, receive the second plurality of bounding boxes and filter the second plurality of bounding boxes in the second period to selectively output a subset of the second plurality of bounding boxes that satisfy the predetermined condition as data output corresponding to the second input data, perform hypothesis suppression on the data output corresponding to the first input data in the second period; and memory configured to store the data output from the processing circuit.

10. The system of claim 9, wherein the data output comprises, for each of the first bounding boxes, class scores indicative of probability that classes of objects being present in each of the first bounding boxes.

11. The system of claim 10, wherein the post-processing circuit comprises a first computation circuit configured to select one or more classes for each of the first bounding boxes as the subset of the data output by comparing class scores of classes for each of the first bounding boxes.

12. The system of claim 11, wherein the post-processing circuit further comprises:

a second computation circuit configured to extract one or more of the first bounding boxes by comparing a class confidence score of each of the first bounding boxes with a threshold confidence score, the class confidence score representing probability that an object of a class is present in each of the first bounding boxes and derived from an object presence confidence score and the class scores, the object presence confidence score included in the data output and indicative of probability that an object is present in each of the first bounding boxes.

13. The system of claim 12, wherein the second computation circuit is configured to determine the class confidence score as a product of the object presence confidence score and a class score with the subset of classes extracted by the first computation circuit.

14. The system of claim 11, wherein the memory is further configured to store the subset of classes for each of the bounding boxes extracted by the first computation circuit.

15. The system of claim 14, wherein the memory comprises:

a plurality of memory registers; and an address generation logic for accessing the plurality of memory registers.

16. The system of claim 12, wherein the processing circuit is configured to perform a non-maximum suppression (NMS) operation to perform the hypothesis suppression on the one or more bounding boxes extracted by the second computation circuit to remove redundant or overlapping bounding boxes of the plurality of first bounding boxes.

17. A method for performing operations associated with a neural network model, the method comprising:

performing, by a neural processing unit (NPU), at least multiply and accumulate operations on a first input data to generate a plurality of first bounding boxes in a first period;

sending the plurality of first bounding boxes from the NPU to a post-processing circuit via a bus in the first period;

filtering the plurality of first bounding boxes and selectively outputting a subset of the first bounding boxes that satisfy a predetermined condition as data output corresponding to the first input data by the post-processing circuit;

storing the data output corresponding to the first input data in a memory of the post-processing circuit;

performing, by the NPU, at least multiply and accumulate operations on a second input data to generate a plurality of second bounding boxes in a second period subsequent to the first period;

filtering the plurality of second bounding boxes and selectively outputting a subset of the second bounding boxes that satisfy the predetermined condition as data output corresponding to the second input data by the post-processing circuit;

storing the data output corresponding to the second input data in a memory of the post-processing circuit; and performing hypothesis suppression on the data output corresponding to the first input data in the second period.

18. The method of claim 17, wherein the data output comprises, for each of the first bounding boxes, class scores indicative of probability that classes of objects being present in each of the first bounding boxes.

19. The method of claim 18, wherein filtering the plurality of first bounding boxes and selectively outputting comprises:

selecting one or more classes for each of the first bounding boxes as the subset of the data output by comparing class scores of classes for each of the first bounding boxes; and extracting one or more bounding boxes by comparing a class confidence score of each of the first bounding boxes with a threshold confidence score, the class confidence score representing probability that an object of a class is present in each of the first bounding boxes and derived from an object presence confidence score and the class scores, the object presence confidence score included in the data output and indicative of probability that an object is present in each of the first bounding boxes.

20. The method of claim 19, further comprising determining the class confidence score as a product of the object presence confidence score and a class score with the subset of classes.

* * * * *